US011538363B2

(12) United States Patent
Kraus et al.

(10) Patent No.: US 11,538,363 B2
(45) Date of Patent: Dec. 27, 2022

(54) POSABLE TRAINING AID

(71) Applicant: Krausko, LLC, Racine, WI (US)

(72) Inventors: Jeffrey L. Kraus, Racine, WI (US); Lawrence E. Kraus, Racine, WI (US)

(73) Assignee: Krausko, LLC, Racine, WI (US)

( * ) Notice: Subject to any disclaimer, the term of this patent is extended or adjusted under 35 U.S.C. 154(b) by 421 days.

(21) Appl. No.: 15/894,435

(22) Filed: Feb. 12, 2018

(65) Prior Publication Data

US 2018/0233068 A1 Aug. 16, 2018

Related U.S. Application Data

(60) Provisional application No. 62/457,404, filed on Feb. 10, 2017, provisional application No. 62/462,458, filed on Feb. 23, 2017.

(51) Int. Cl.
| G09B 23/32 | (2006.01) |
| G09B 25/00 | (2006.01) |
| G09B 19/00 | (2006.01) |
| G09B 9/00 | (2006.01) |
| A63B 69/34 | (2006.01) |
| F41J 1/08 | (2006.01) |
| F41B 15/00 | (2006.01) |
| F41J 9/02 | (2006.01) |
| F41J 1/01 | (2006.01) |
| A63B 71/02 | (2006.01) |

(52) U.S. Cl.
CPC .............. *G09B 25/00* (2013.01); *A63B 69/34* (2013.01); *G09B 9/003* (2013.01); *G09B 19/003* (2013.01); *A63B 2071/025* (2013.01); *A63B 2209/00* (2013.01); *A63B 2225/305* (2013.01); *A63B 2225/50* (2013.01); *A63B 2244/10* (2013.01); *F41B 15/00* (2013.01); *F41J 1/01* (2013.01); *F41J 1/08* (2013.01); *F41J 9/02* (2013.01)

(58) Field of Classification Search
CPC ...... G09B 23/32; G09B 23/34; A63B 69/004; A63B 69/34; A63B 69/345; A63B 69/3617; A63B 2244/10; A63B 2244/102; A63B 2244/104; A63B 2244/106; A63B 2244/108
USPC ........................................................ 434/256
See application file for complete search history.

(56) References Cited

U.S. PATENT DOCUMENTS

| 604,243 A | 5/1898 | Verpillier et al. |
| 2,129,421 A | 9/1938 | Hales |
| 2,162,073 A | 6/1939 | Evans |

(Continued)

OTHER PUBLICATIONS

"How to Build a Grappling Dummy," J. Williams, https://web.archive.org/web/20140222110518/http://justinsrefuge.wordpress.com/2009/09/28/how-to-build-a-grappling-dumm/, Feb. 22, 2014 (Year: 2014).*

*Primary Examiner* — Kurt Fernstrom
(74) *Attorney, Agent, or Firm* — Boyle Fredrickson, S.C.

(57) ABSTRACT

A lightweight training aid is disclosed including selectively positioned posable appendages for use in various training exercises. The training aid may be formed of one or more separable and distinct portions including a head module, a torso module and a leg module, and combinations thereof. The head module and/or leg module may be releasably coupled to the torso module by interchangeable mounting arrangements. Appendages of the training aid may be posable, at least within a set range of motion, within any of a potentially infinite number of orientations. Methods of using such a training aid also are disclosed.

30 Claims, 23 Drawing Sheets

(56) References Cited

U.S. PATENT DOCUMENTS

| | | | |
|---|---|---|---|
| 2,526,217 A | 12/1948 | Gilman | |
| 2,574,046 A | 11/1951 | Logan | |
| 2,909,370 A | 12/1958 | Fortney | |
| 3,357,610 A | 12/1967 | Quinby, Jr. | |
| 3,391,936 A | 7/1968 | Grimes | |
| 3,558,135 A | 1/1971 | Rees et al. | |
| 3,573,867 A | 4/1971 | Mehrens | |
| 3,680,861 A | 8/1972 | Schmidt | |
| 3,700,237 A | 10/1972 | Kopp | |
| 3,827,690 A | 8/1974 | Rogers | |
| 3,806,406 A | 12/1974 | Ely | |
| 3,888,481 A | 6/1975 | Adams, Jr. et al. | |
| 3,997,160 A | 12/1976 | George | |
| 4,387,892 A | 6/1983 | Wen | |
| 4,564,192 A | 1/1986 | Lebowitz | |
| 4,667,954 A | 5/1987 | McCorkle | |
| 4,688,792 A | 8/1987 | Rivkin | |
| 4,749,184 A | 6/1988 | Tobin | |
| 4,824,414 A | 4/1989 | Goldblatt | |
| 4,869,503 A | 9/1989 | Grasso | |
| 4,934,938 A | 6/1990 | Orlandi et al. | |
| 4,946,159 A | 8/1990 | Jones | |
| 4,989,862 A | 2/1991 | Curtis | |
| 5,090,696 A | 2/1992 | Forrest, Sr. | |
| 5,280,905 A | 1/1994 | Micco | |
| 5,335,906 A | 8/1994 | Delker | |
| 5,385,523 A | 1/1995 | Forrest | |
| 5,401,901 A * | 3/1995 | Gerry | B32B 7/02 174/391 |
| 5,700,230 A * | 12/1997 | Cardona | A63B 69/34 482/83 |
| 5,984,809 A | 11/1999 | Hadar et al. | |
| 6,063,011 A * | 5/2000 | Pelchat | A63B 69/004 482/83 |
| 6,139,328 A * | 10/2000 | Picotte | A63B 69/345 434/247 |
| 6,261,194 B1 | 7/2001 | Hadar et al. | |
| 6,302,831 B1 | 10/2001 | Henry | |
| 6,599,206 B1 | 7/2003 | Forrest, Sr. et al. | |
| 6,685,581 B2 | 2/2004 | Krause et al. | |
| 6,761,650 B1 | 7/2004 | Dettmann | |
| 6,824,504 B2 | 11/2004 | Ott | |
| 6,942,585 B1 | 9/2005 | Krause | |
| 6,988,965 B2 | 1/2006 | Krause | |
| 7,056,238 B1 | 6/2006 | Brown | |
| 7,070,521 B2 | 7/2006 | Bayduke | |
| 7,131,917 B2 | 11/2006 | Spencer | |
| 7,147,579 B2 | 12/2006 | Forrest | |
| 7,357,760 B1 | 4/2008 | Rios | |
| 7,491,139 B2 | 2/2009 | Bridge et al. | |
| 7,497,792 B2 | 3/2009 | Hutton | |
| 7,527,568 B2 | 5/2009 | Joseph | |
| 7,715,679 B2 * | 5/2010 | Kowalczyk | G02B 6/4452 385/135 |
| 7,794,337 B2 | 9/2010 | Gamboa | |
| 7,828,701 B1 | 11/2010 | Chen | |
| 7,998,035 B2 | 8/2011 | Chen | |
| 8,439,809 B2 | 5/2013 | Machado et al. | |
| 8,617,034 B2 | 12/2013 | Eem | |
| 8,708,868 B2 | 4/2014 | Partlo | |
| 8,777,818 B1 | 7/2014 | Tate, Jr. | |
| D731,012 S | 6/2015 | Gilman | |
| 9,050,514 B1 | 6/2015 | Mirza | |
| 9,254,429 B1 | 2/2016 | Gilman | |
| 2002/0077226 A1 | 6/2002 | Ott | |
| 2002/0147061 A1 | 10/2002 | Krause et al. | |
| 2002/0193211 A1 | 12/2002 | Kao | |
| 2006/0100040 A1 | 5/2006 | Spencer | |
| 2007/0225089 A1 | 9/2007 | Jones | |
| 2008/0015093 A1 | 1/2008 | Helton | |
| 2008/0058128 A1 | 3/2008 | Joseph | |
| 2008/0182729 A1 * | 7/2008 | Ziska | A63B 69/34 482/89 |
| 2009/0088302 A1 | 4/2009 | Brenner et al. | |
| 2009/0264262 A1 * | 10/2009 | Brenner | A63B 69/34 482/83 |
| 2011/0256990 A1 | 10/2011 | Machado et al. | |
| 2013/0137554 A1 | 5/2013 | Knight | |
| 2013/0296141 A1 | 11/2013 | Partlo | |
| 2016/0375337 A1 * | 12/2016 | Kastner | A63B 69/345 473/441 |

* cited by examiner

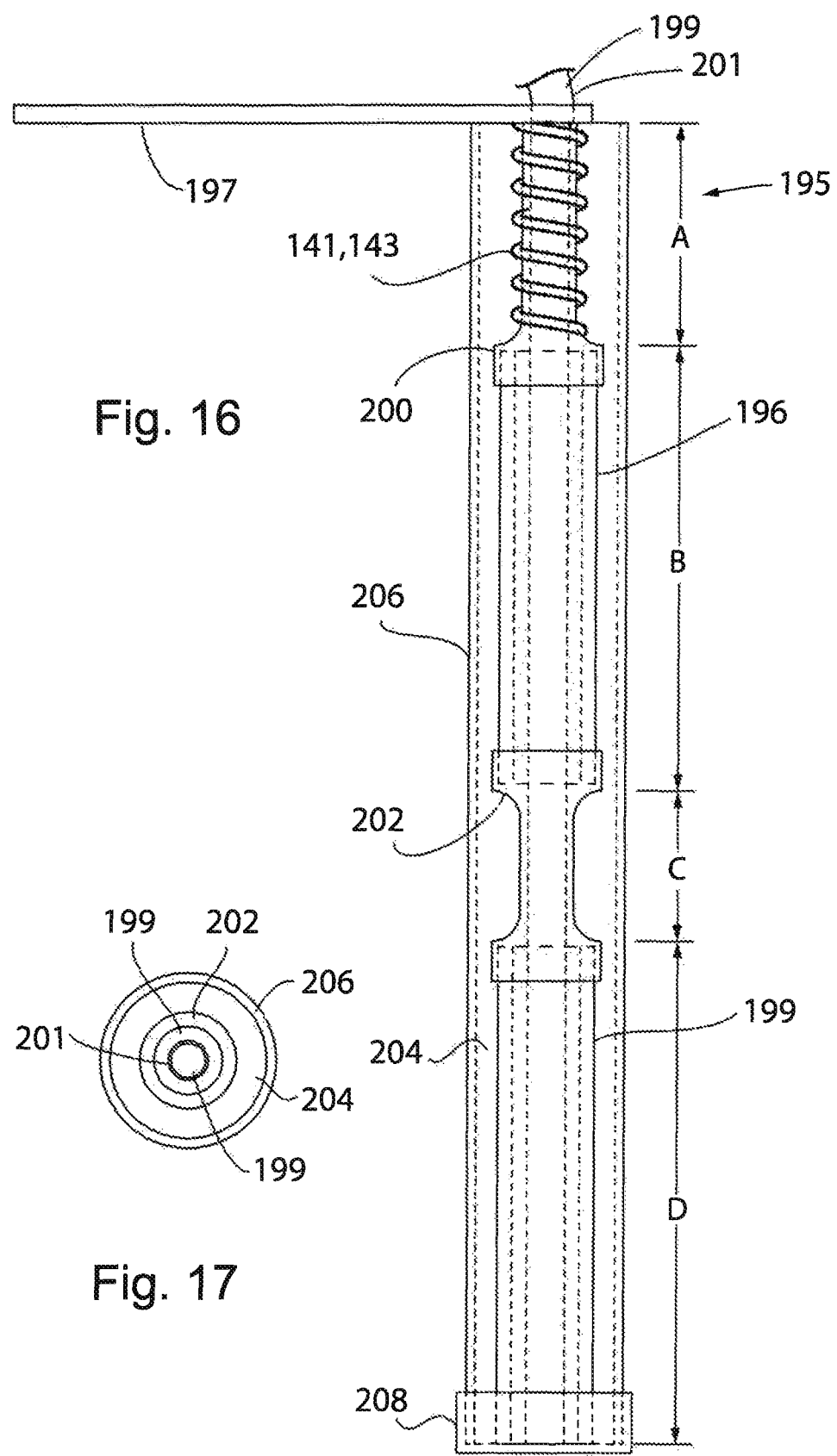

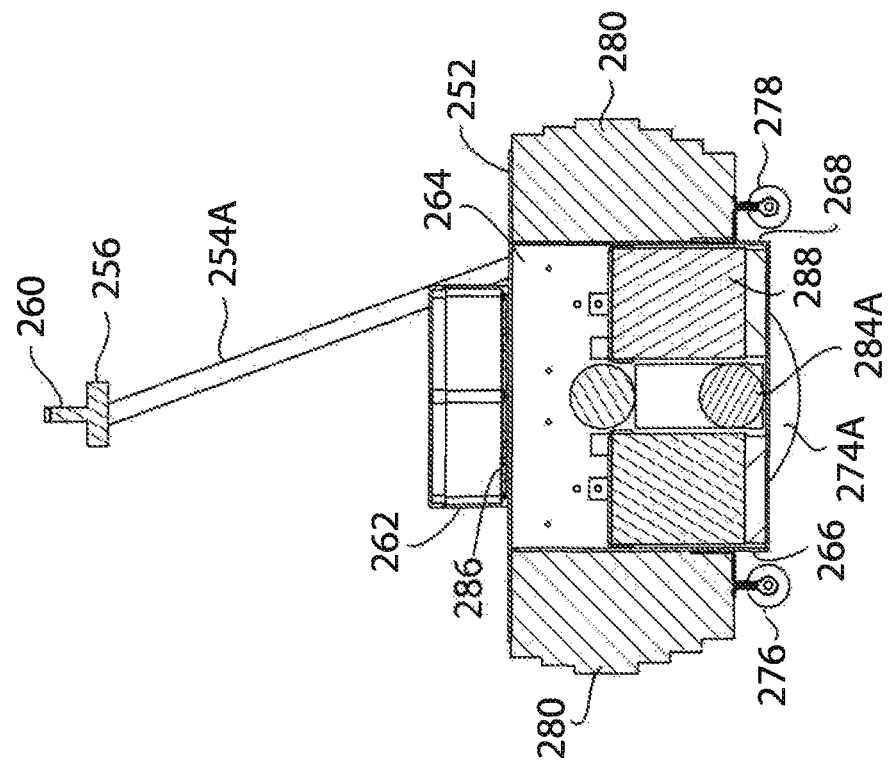
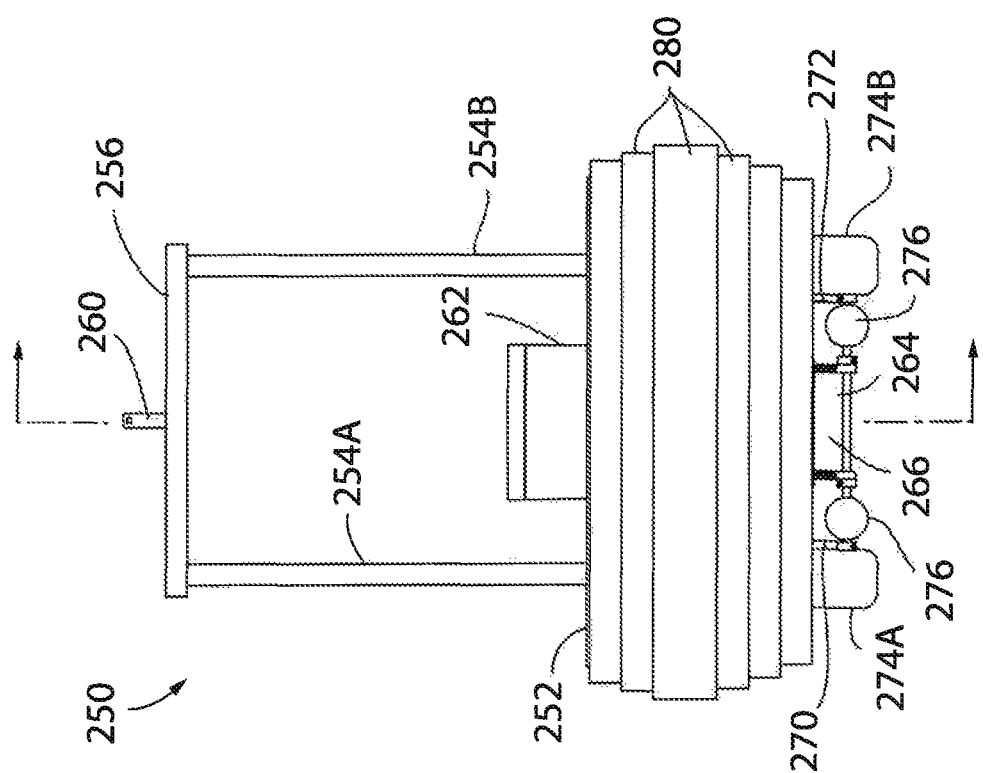
Fig. 25
Fig. 24

POSABLE TRAINING AID

CROSS-REFERENCE TO RELATED APPLICATIONS

This application claims priority of U.S. Provisional Patent Application Ser. Nos. 62/457,404, filed on Feb. 10, 2017, and 62/462,458, filed on Feb. 23, 2017 the content of which are both incorporated herein by reference in its entirety as if fully set forth herein.

BACKGROUND OF THE INVENTION

1. Field of the Invention

The invention relates generally to a modular training aid for use in combat, self-defense and law enforcement type training exercises, and more particularly, relates to a lightweight training aid with posable appendages that may be selectively positioned for use during training exercises. The invention additionally relates to a method of using such training aids.

2. Discussion of the Related Art

The customizable training device market has been quickly growing for many sports and martial art enthusiasts. This interest has resulted in many new devices for training in contact sports such as football, Kung Fu, and MMA. Most of these devices include resilient appendages that may receive forceful contact from a user, and then return to an original preset position. Some of these devices even allow the arms to be preset to a finite number of starting positions and use springs to return the arms to those positions after they have been deflection. However, such devices are not configured for use in training that requires longer arms to be positioned behind the back or over the head of the training dummy. For example, during self-defense, security, military or law enforcement training, it is desirable to practice restraining an individual with the use of a training aid. However, to do so longer arms with sufficient range of motion are required to position the arms behind the head or back of the dummy. It is also desirable for the arms of such a training aid to remain in a restrained position while a user practices applying handcuffs or other arm restraints. Prior training aid do not provide either arms of a sufficient length or the appendage ability to remain in a restrained position as is necessary to adequately train for such restraint techniques.

Additionally, it is desirable for personal defense, security, and/or law enforcement training to practice handheld weapon disarming techniques. Prior training aids do not provide arms that include hands or similar retaining structures that are configured to carry a simulated weapon. This deficiency renders prior training aids ineffective for practicing disarming techniques.

For example, some training devices have been developed that combine a stationary or stand-mounted striking aid with outwardly extending arms. Such devices may even include springs to allow the training device arms to deflect and return to a starting position when struck. However, such devices are limited in their appendage configuration, often relying on fasteners to fix the arms in one of a few predetermined positions prior to training. Furthermore, such devices often require the adjustment of fasteners or screws to reposition the training device's arms. Accordingly, such devices do not provide for appendages that can be readily manipulated into a variety, i.e., infinite number, of positions.

Additionally, such devices do not provide a training device that allows for rapid manipulation of desired starting position of appendages, due to their reliance on fasteners. Still further, due to their inclusion of springs that retain or rapidly the arms to their initial positions, such devices do not allow the appendages, or portions thereof, to maintain a desired "posed" configuration in which the appendage retains its manipulated position unless and until the appendage is again manipulated.

Furthermore, some training devices that attempt to include anatomically representative torso or bases, rather than a stationary stand mount, also fail to provide posable appendages. Rather, such prior training devices often utilize springs at the shoulder and hip joints of the training device which allows the corresponding appendage to deflect under striking force and then return to a single predetermined starting position. Such devices do not allow the user to manipulate the appendages into a desired starting position, and then generally maintain that position while awaiting an impending strike or training technique to be applied by the user. Furthermore, due to the integrated nature of many of these anatomically representative training aids, they are not well suited for modular use. That is to say that individual components of such prior art training aids are not configured for independent use in training exercises.

Additionally, there have been some training devices that include heads. However, such devices lack the use of soft foam material and/or spring mountings for the heads to minimize trainee hand injuries while still providing the realistic features which provide striking or pressure point targets that are required for advanced training.

Therefore, a need exists for a modular training device that is well suited for use in law enforcement, security, military, and/or self-defense training, where the head or legs may be used separately from the torso.

A further need exists for a modular training device where the head, torso or legs may be used selectively used individually or in combination with one or more accessory; such as a stand, handle, removable hand, and/or simulated weapon.

A need also exists for a modular training device that includes posable arms of a sufficient length and range of motion such that they can be positions behind the torso or head while practicing handcuffing and restraint techniques.

Additionally, a need exists for a modular training device that can be manually held and manipulated for use in training with beginners where height adjustments may be required or with advanced students for more focused target training.

A further need exists for a modular training aid with at least one appendage that can be "posed" in any position desired by being subjected to a manually or an internal or external manipulation force into a desired orientation and thereafter retaining that orientation until it is again subject to a manipulation force.

SUMMARY OF THE INVENTION

In accordance with an aspect of the invention, one or more of these needs is met by providing a lightweight, portable and either hand-held or mounted training aid for a training exercise such as an athletic, mixed martial arts (MMA), self-defense, law enforcement, security, or military training. The training aid may include human-like arms and/or legs that are poseable, which is to say that they can be posed in various, even possibly an infinite number, of offensive or defensive position and bend like human arms and legs when subjected to combat hand-to-hand maneuvers, self-defense or law enforcement techniques such as disarming techniques, arm holds, hand cuffing, knee strikes, and dog training. As used herein the term "poseable" also includes the ability of an appendage of the training aid to flex, bend, or otherwise manipulated into a desired position and retain that general position absent the application of a force to reposition the appendage. In one embodiment, the posable appendages may be selectively positioned in any user defined orientation that is configured to replicate at least one of: abduction, adduction, extension, flexion, rotation, and circumduction movements of a human appendage. In some embodiments of the present invention, where the movement of the appendage is not otherwise restricted, the number of possible posable positions within a given range need not be limited and thus may be infinite. Accordingly, the appendages may be manipulated or positioned in any desired configuration for use in training. The posable appendages of the present invention may include a core of malleable material exhibiting minimal physical memory, thereby allowing them to be posed in a manner that resists returning to the initial position.

In one aspect, the present invention may include an aid for use in a training exercise that includes at least one of: a torso module, a releasable head module adapted to engage the torso module, and a releasable leg module adapted to engage the torso module. The modular training aid has posable appendages that are independently posable, such that a user can independently pose each appendage during the training exercise.

In one aspect of the present invention, the posable appendage has a range of motion of between approximately 1° and 120° from a neutral position along a length of the posable appendage. At an end of the posable appendage that is affixed to the frame, in one embodiment the core material of the posable appendage may be received within a coil spring sheath, resulting in a reduced range of motion of between approximately 1° and 75° from a neutral position, where the neutral position is defined by a generally linear appendage that extends generally perpendicular to the corresponding supporting frame.

In one aspect of the invention, the possible appendage is passively retained in the user-selected position until a force is applied during, which is to say that gravity alone will not alter the user-selected position of the appendage absent an additional applied force.

In one aspect of the invention an applied force of between 0.5 and 3.0 pounds per square inch ("psi") to a position on the posable appendage that is approximately 24 inches from a fixed end of the appendage, that is in a neutral position, is sufficient to move the appendage a distance of approximately 1.0 to 2.0 inches from the neutral position.

In one aspect of the invention, the possible appendage requires the application of a variable force to move the appendage into a user-selected position. That is to say that the further the posable appendage is moved from the neutral position, the larger the force necessary to move the appendage is required until the posable appendage reaches an upper limit of its range of motion, wherein the application of additional force results in a negligible movement of the posable appendage.

In one aspect, the present invention may also include a detachable appendage. For example, it may include a detachable hand, foot, or handheld tool that allows for law enforcement and military training relating to restraining and disarming an assailant.

In one aspect of the present invention, discrete modular head, modular torso, modular leg assembly and various bases may be combined through the use of an interchangeable mounting arrangement such as a central mating tube and locking pin system.

In another aspect of the present invention, the locking pin system or other interchangeable mounting arrangement allows many different modules of the present invention to be used either individually, or in combination. For example, the head may be connected to the torso or it may be used independently with its own handle. The torso may be used with or without the head and, because it is portable, it may be used by an instructor with or without legs or any support system (such as a monopole). The legs may be used as an independent module. The entire invention, head, torso and legs may also be linked together using the interchangeable mounting arrangement.

In yet another aspect of the present invention, the head assembly may include a connection device configured to allow the entire body to be hung from a support stand or an overhead mounting system.

In still another aspect of the present invention, handles on the back of the torso unit enable all or portions of the device to be easily attached to other standard devices such as a heavy bag or floor stand when increased opponent mass and stability is desired to provide more resistance to blows. The unit's various mountable options also allow a person to work out individually with no assistant to hold the device In still another aspect of the present invention, the interchangeable mount system also allows the torso module, with or without the head, to be attached to a leg module with posable legs that can be mounted to a fixed base or mounted to a remotely controlled motorized base. The motorized base version may be valuable in uses such as dog pursuit training, mobile military targeting or contact sports where the training aid is covered in a protective outer coating. When used with a motorized base, an impact force of less than approximately 0 pounds to 80 pounds, and more preferably approximately 0 pounds to 70 pounds applied to the center of the body will remain upright, e.g., not tip the training aid and motorized base over, while an impact force of approximately greater than 80 pounds, and more preferably greater than approximately 120 pounds applied to the center of the body will tip the training aid and motorized base over.

In another aspect of the invention, a portion of the motorized base, and preferably an electrical controller is housed within an electromagnetic shield, such as a faraday box, to prevent damage to the controller when the modular training aid is used during TASER® conducted electrical weapon training exercises.

In another aspect of the invention, the possible appendage includes a core of bendable malleable material that exhibits minimal physical memory. The core may be formed of aluminum or aluminum alloy wire, having a tensile strength of approximately at-least 300000 psi.

In yet another aspect of the invention, the posable appendages are arms that include a handcuff retaining recess between adjacent ridges that are circumferentially located about an outer surface of the arms, near an end corresponding to a wrist position. In use, the user will be able to bend the posable arms behind the torso or head of the training aid and apply handcuffs or restraints at the handcuff retaining recess without the handcuffs sliding along the length of the arms.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 16 is a top plan view of a representative flexible appendage of the torso and flexible leg module of the modular training aid of FIG. 1;

FIG. 17 is a cross-section view of a representative flexible appendage of the torso and flexible leg module of the modular training aid of FIG. 1;

FIG. 24 is a front view of the mobile base of FIG. 22;

FIG. 25 is a side cross-sectional view of the mobile base of FIG. 22;

DETAILED DESCRIPTION OF THE PREFERRED EMBODIMENT

Figure 2:
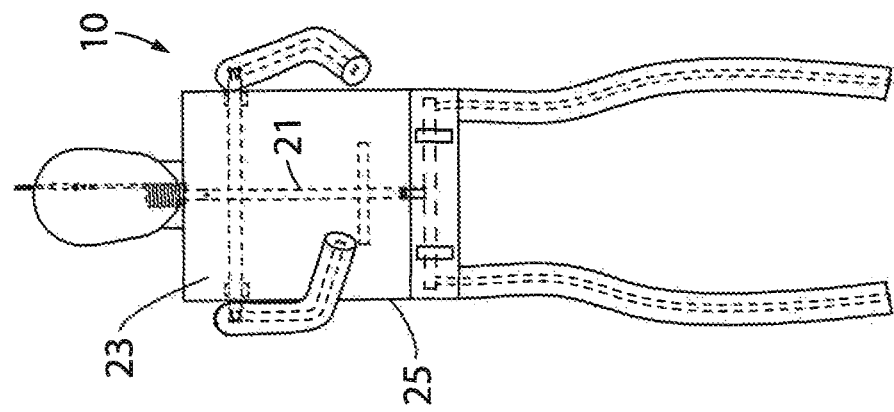
FIG. 2 is an alternative front view of the modular training aid of FIG. 1, in which the internal frame is shown in broken lines.

A wide variety of modular training aids and assemblies could be constructed in accordance with the invention as defined by the claims. Hence, while several exemplary embodiments of the invention will now be described, it should be understood that the invention is in no way limited to any of those embodiments.

FIGS. 1-27 illustrate a modular training device 10 that is well suited for use as a striking aid for use in contact sports, such as martial arts, self-defense, security, military and law enforcement training. The modular training device 10 is particularly well suited for use as a movable or mountable training aid as a result of it being relatively lightweight and portable. Referring to FIGS. 1-4, and initially FIGS. 1 and 2, the modular training device 10 may generally comprise a combination of discrete and selectively releasable modules, including: a head module 12; a torso module 14 having first and second posable arms 16A, 16B extending therefrom; and, a leg module 18 having first and second posable legs 20A, 20B extending therefrom. The appendages, namely the first and second arms 16A, 16B and first and second legs 20A, 20B of the modular training aid 10 may be posable, which is to say that the appendages may be selectively positioned or manipulated for use during training exercises, at least within a set range of motion, within any of a potentially infinite number of orientations. As will be described in further detail below, within a set range of motion the posable appendages of the modular training aid 10 will not return to a preset orientation when an applied force is removed, but rather maintain the selectively positioned or manipulated orientation.

Figure 1:
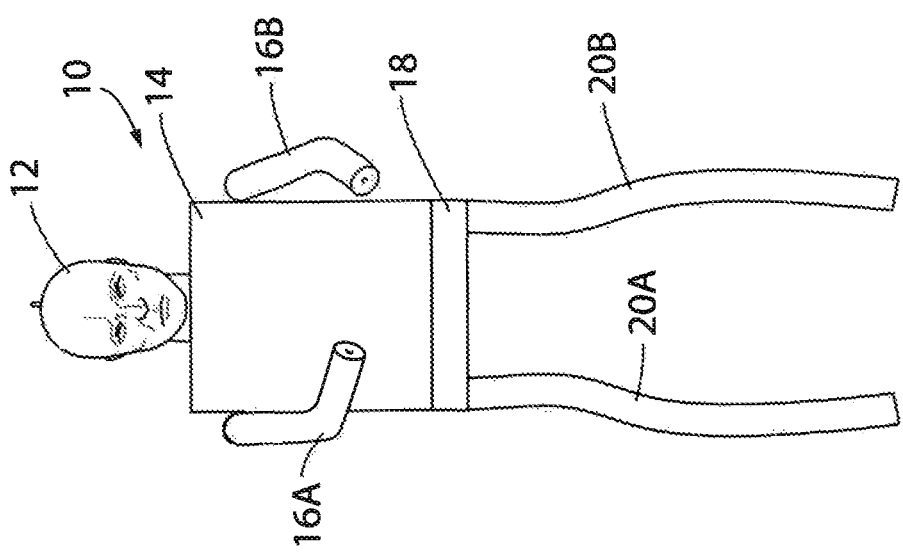
FIG. 1 is a front view of a modular training aid in accordance with one embodiment of the present invention including a head module, torso module and flexible leg module.

Generally, the modular training device 10 is configured to anatomically represent a human body having a height of approximately between 54 inches and 76 inches, and more preferably approximately 71 inches. The modular training device 10 is also configured to be relatively lightweight such that it can be held and fully supported by a person or instructor without the use of a stand or base. In such an embodiment, the modular training device 10 may have weight of approximately between 20 lbs. and 40 lbs., and more preferably approximately 30 lbs. While FIG. 1 shows the head module 12, torso module 14, and leg module 18 in an interconnected or attached configuration, as will be described in further detail below, each of the above-mentioned modules 12, 14, 18 may be removed and used independently. As shown in FIG. 2, the modular training aid 10 includes an internal frame 21 that is covered by foam 23, such as flexible, semi-rigid foam and preferably a low density, self-skinning foam, or lightweight polymer. An outer covering 25, such as a vinyl or nylon material may be applied over at least a portion of the foam 23, as will be described in further detail in the following discussion of the individual modules 12, 14, 18. In an alternative embodiment, the outer covering 25, or a portion there of may be include a Kevlar or alternative projectile-impediment covering, or even a material configured to receive and absorb energy from various combat training exercise, such as TASER® conducted electrical weapon, training, fire-arm marksmanship training, non-lethal projectile training, and chemical propellant training.

Figure 3:
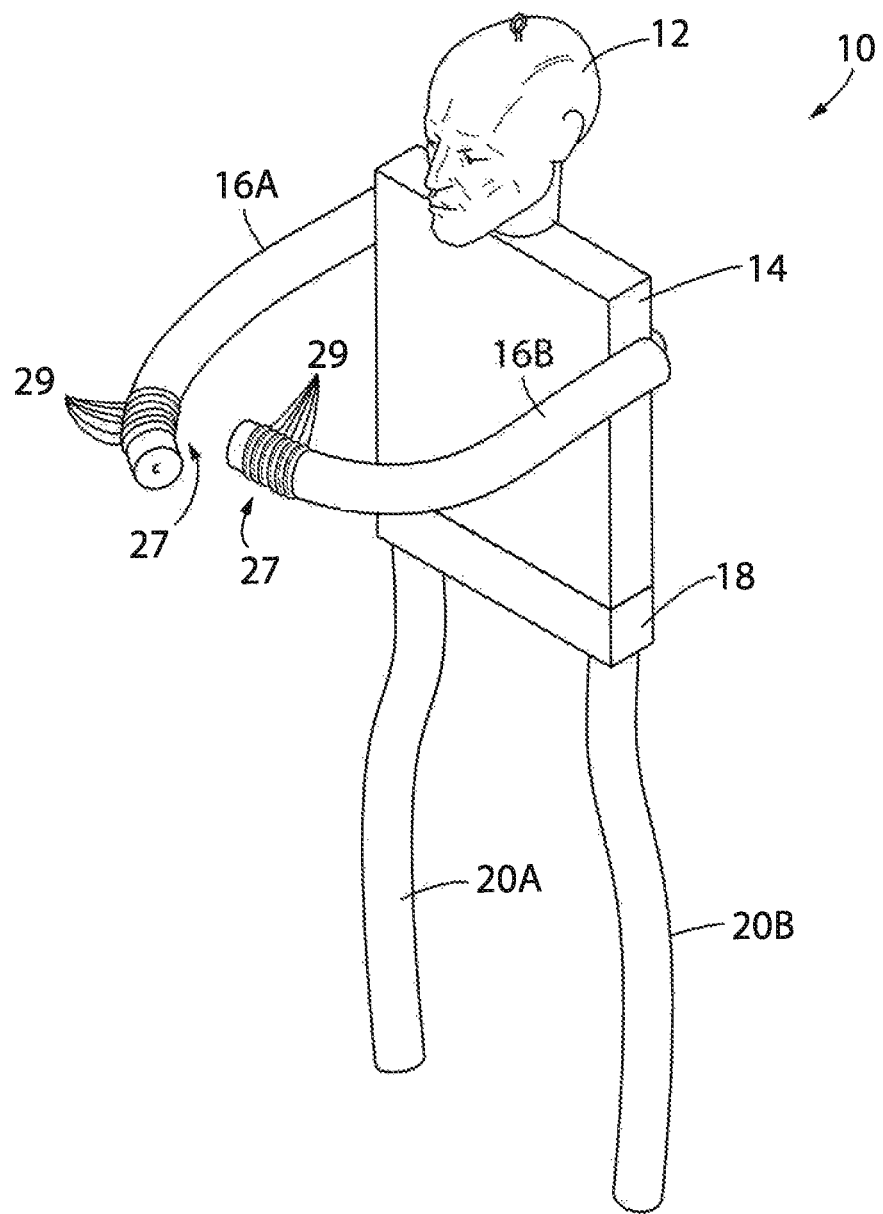
FIG. 3 is a front isometric view of an alternative embodiment of the modular training aid of FIG. 1, including handcuff target areas on the forearms of the modular training aid.
Figure 4:
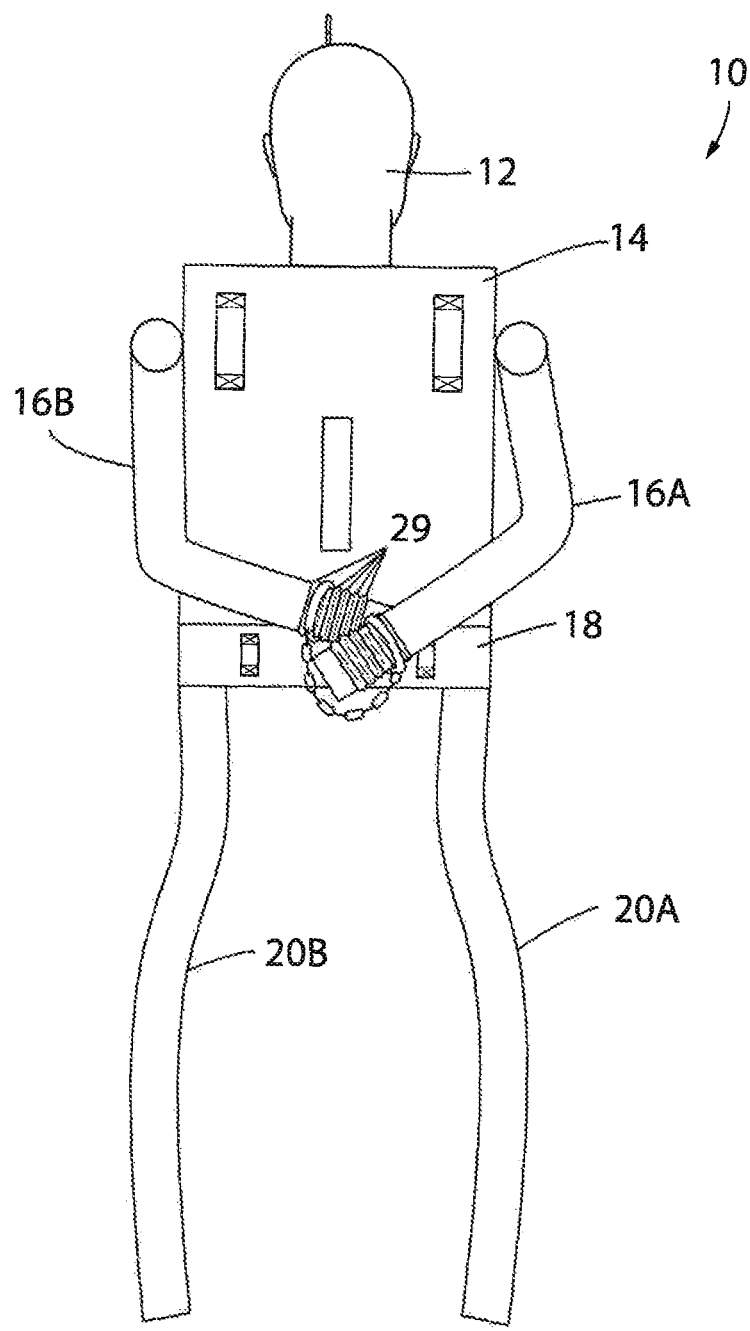
FIG. 4 is a rear view of the modular training aid shown in FIG. 4, in which the arms are positioned behind the torso and handcuffs have been applied to the forearms of the modular training aid.

Turning now to FIGS. 3 and 4, the modular training device 10 is shown including the above-mentioned head module 12, torso module 14, and leg module 18. In the illustrated embodiment of FIGS. 3 and 4, which are particularly well suited for use in restraint technique and handcuff application training, the first and second posable arms 16A, 16B are each shown including a handcuff target area 27 at or about the approximate anatomical location of an individual's wrist. That is to say that the handcuff target area 27 on each of the first and second posable arms 16A, 16B is located approximately 1 to 3 inches from an end of the respective arm 16A, 16B, and has a length of approximately 1 to 5 inches. As illustrated in FIGS. 3 and 4, the handcuff target area 27 defines a plurality of ribs 29 that extend circumferentially about the outer surface of the respective arm 16A, 16B. The ribs 29 may be raised or recessed relative to the height of the outer surface of the respective arm 16A, 16B, and provide both a visual target for a user when applying handcuffs to the modular training aid 10, as well as inhibit lateral sliding of the handcuffs along the length of the respective arm 16A, 16B. That is to say that the closed handcuff will be positioned in a trough bordered by adjacent ribs 29 in the handcuff target area 27. As shown in FIG. 4, the arm 16A, 16B of the torso module 14 are of a sufficient length as to be secured being the torso of the modular training aid 10, as will be described in further detail below. In addition to the ribs 29, the handcuff target area 27 may also define a portion of the outer covering 25 that is formed of a material having an increased wear resistance relative to the remainder of the outer covering 25.

Figure 5:
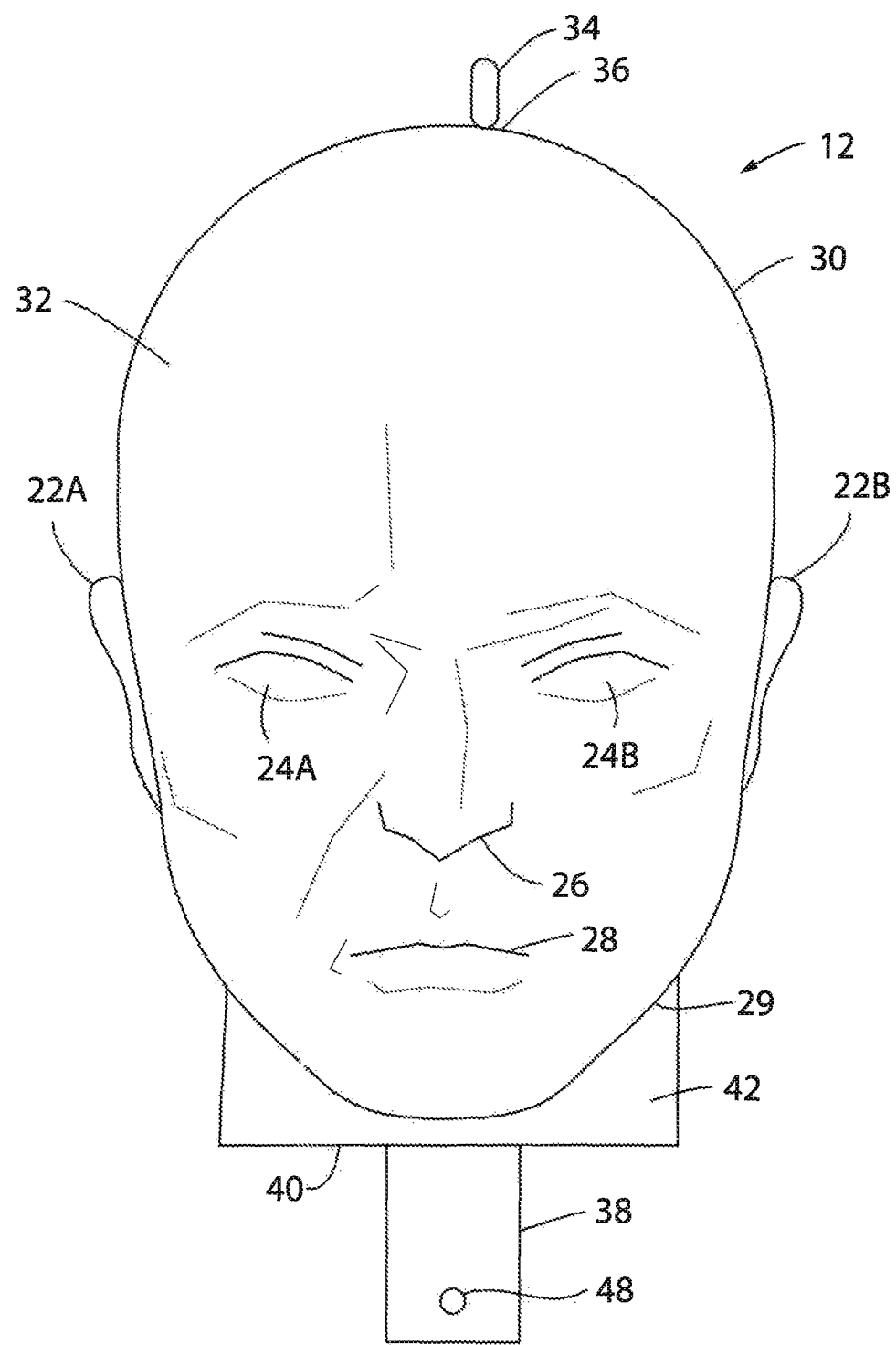
FIG. 5 is a front view of the head module of the modular training aid of FIG. 1.

Turning now to FIGS. 5-9, the head module 12 will be described in further detail. Initially, FIG. 5 shows the head module 12 of the modular training device 10 configured to anatomically represent a human head including target points, i.e., anatomically representative facial features such as ears 22A, 22B, eyes 24A, 24B, nose 26, mouth 28 and jaw line 29 formed within the outer surface 30 of the head module 12. Such facial features may provide readily identifiable striking target points for use during striking training exercises. In one embodiment of the present invention the head module 12 is formed of a flexible, semi-rigid foam body 32, and preferably a low density, self-skinning foam, or lightweight polymer with the above listed facial features being cut from or integrally molded to the outer surface 30 of the foam body 32. It should also be understood that the inner portion of the head module 12, (or even the torso module 14 or leg module 18) may be either hollow or formed of a light weight inner core as to reduce or otherwise minimize the overall weight of the training aid 10. The modules 12, 14, 18 may also contain weight reducing cavities (not shown) throughout. Alternatively, such cavities may be used to house additional components, such as a camera, accelerometer, force meter, and etc., that can be used to provide feedback information relating to use of the training aid during the training exercise.

A connection device 34 may extend upwardly from the top edge 36 of the head module 12. The connection device 34 may take the form of a ring, hook, eyelet, shackle, or other attachment mechanism as will be described below. A head connector bar 38 extends downwardly from the bottom edge 40 of the neck 42 of the head module 12. The head connector bar 38 is configured to allow for the head module 12 to be releasably connected to various components of the modular training aid 10, including the torso module 14, a handle support 44 (shown in FIG. 8), an extended handle support 67 (shown in FIG. 9), or a mono-pole support 227 (shown in FIG. 19). The head connector bar 38 is preferably polygonal in cross section, as to inhibit rotation, and may include one or more apertures 48 extending therethrough and configured to receive a locking pin, as described below. The head connector bar 38 and its associated locking pin may be interchangeable with other connectors to permit different appendages to be mounted at different locations or mounted to different devices. This mounting arrangement thus should be thought of as only one of a variety of interchangeable mounting arrangements falling within the scope of the present invention.

Figure 6:
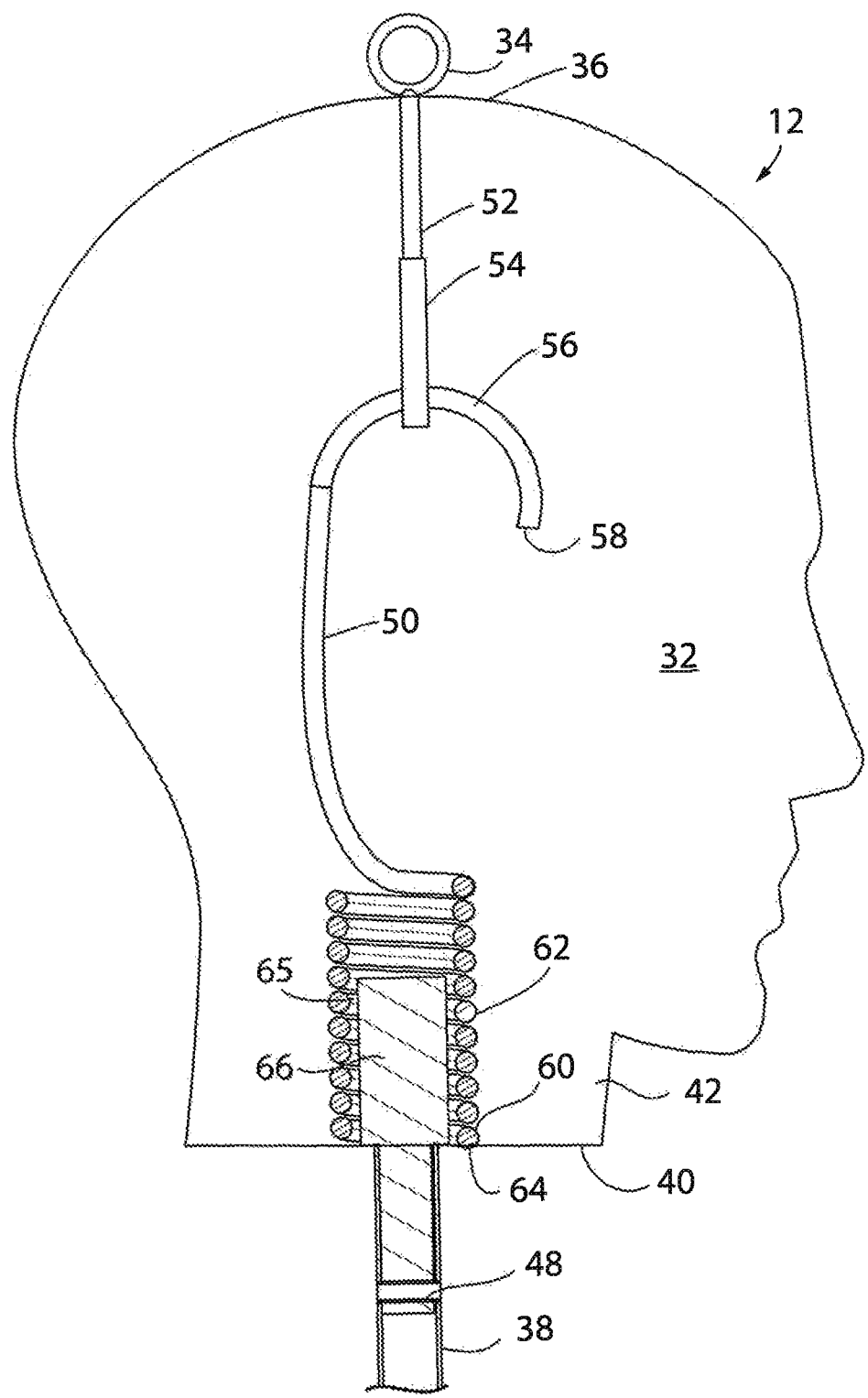
FIG. 6 is a cross-sectional view of the head module of FIG. 5.

Turning now to FIG. 6, the internal cross-section of the head module 12 shows a central support 50 embedded within the foam body 32 and extending generally along the longitudinal axis of the head module 12 from the connection device 34 to the head connector bar 38. As shown in FIG. 6, the connection device 34 is affixed to a threaded shaft 52, which is received within a threaded fastener 54, which is in turn connected to the central support 50. Accordingly, by means of rotating this turnbuckle style connection device 34, its height relative to the top edge 36 of the head module 12 may be adjusted. That is to say that the connection device 34 may be rotated such that is disposed within the foam core 32 and below the top edge 36 of the head module 12, fully extending above the top edge 36 of the head module 12 (as shown in FIG. 6), or any intermediate position. In one embodiment of the present invention, the top edge 36 of the head module 12 may include a recess (not shown) for receiving the connection device 34 when it is rotated to its lowest point, below the top edge 36 of the head module 12. As shown in FIG. 6, threaded fastener 54, which is connected to the central support 50, may be connected to an arcuate or curved portion 56 of the central support 50, located near the first end 58 of the central support 50. The curved portion 56 of the central support 50 may provide additional structural strength to the head module 12, while also providing an attachment point for the threaded fastener 54.

Still referring to FIG. 6, the opposing second end 60 of the central support 50 may terminate in a helical coil spring section 62 disposed within the neck 42 of the head module 12. The second end 60 of the central support 50 may be welded or brazed directly to the head connector bar 38. Alternatively, as shown in FIG. 6, the second end 60 of the central support 50 and the head connector bar 38 may be welded or brazed to opposing surfaces of a mounting plate 64. A protrusion or pin 66, which may also be welded or brazed to the upper surface of the mounting plate 64 is located within, but not affixed to the interior surface of the coil spring section 62.

In use, in response to a trainee applying a striking force to the outer surface 30 of the head module 12, the head module 12 may be deflected at the spring coil section 62. Deflection of the head module 12 at its spring coil section 62, which results in a dampening of the applied force, may exhibit a range of motion of approximately 0° to 60° from a resting neutral position, in any direction perpendicular to the longitudinal axis of the head module 12. Stress exerted on the coil spring section 62, which would otherwise be transmitted through the central support 50 and to the attachment point between the second end 60 of the central support 50 and the mounting plate 64 are minimized by the presence of the pin 66. That is to say that movement of the coil spring section 62 in response to a trainee applied striking force on the head module 12 is inhibited by the pin 66, which is located within the interior of the coil spring section 62. By way of engaging an inner surface 65 of the coil spring section 62, but not being directly affixed thereto, the pin 66 both receives force applied by the coil spring section 62, which would otherwise be translated to the mounting plate 64 in the form of shearing forces. Additionally, the pin 66 also allows for variable movement of the coil spring section 62 along the length of the pin 66, which would not otherwise occur if the coil spring section 62 was directly affixed to the pin 66.

Figure 7:
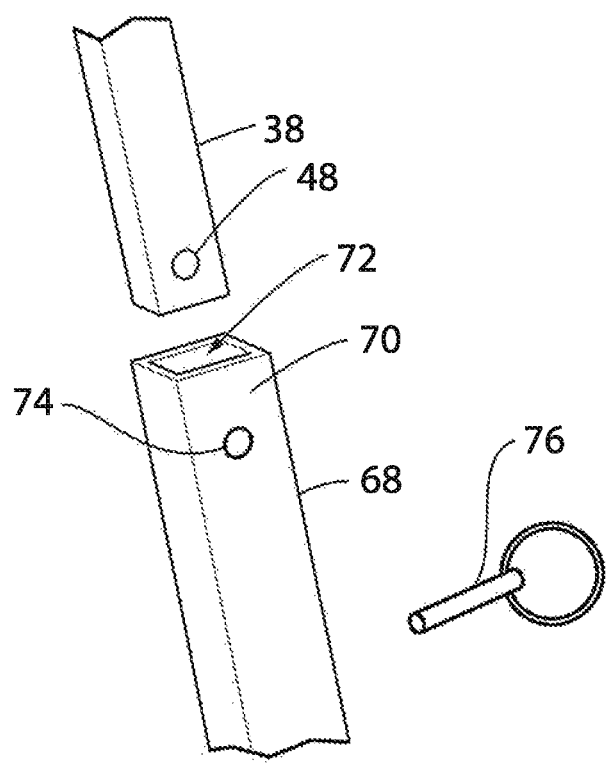
FIG. 7 is a partial front detail view of a connection between the head module and torso module of the modular training aid of FIG. 1.

Turning now to FIG. 7, the head connector bar 38 is shown in further detail. As previously discussed, the head connector bar 38 is configured to allow for the head module 12 to be releasably connected to various components of the training aid 10, including the torso module 14, a handle support 44 (shown in FIG. 8), an extended handle 67 (shown in FIG. 9), or a mono-pole support 227 (shown in FIG. 19). The head connector bar 38 is preferably polygonal in cross section, and may include one or more apertures 48 extending therethrough and configured to receive a locking pin 76, as described below. The corresponding receiving tube 68, includes a wall 70, and a cavity 72 defined within the wall 70. The cavity 72 is sized to slidably receive the head connector bar 38 within the receiving tube 68. One of more apertures 74 located in the wall 70 of the receiving tube 68 are oriented to overlap with the apertures 48 of the head connector bar 38. In this configuration, a locking pin 76 may be passed between both sets of apertures 48, 74 in order to releasable connect the head connector bar 38 to the receiving tube 68. While the receiving tube 68 in FIG. 7 has been described generally, it may be integrated into the torso module 14, handle support 44 (shown in FIG. 8), an extended handle 67 (shown in FIG. 9), or a mono-pole support 227 (shown in FIG. 19) of the modular training aid 10, such that the head module 12 may be utilized in a variety of different training applications.

Figure 8:
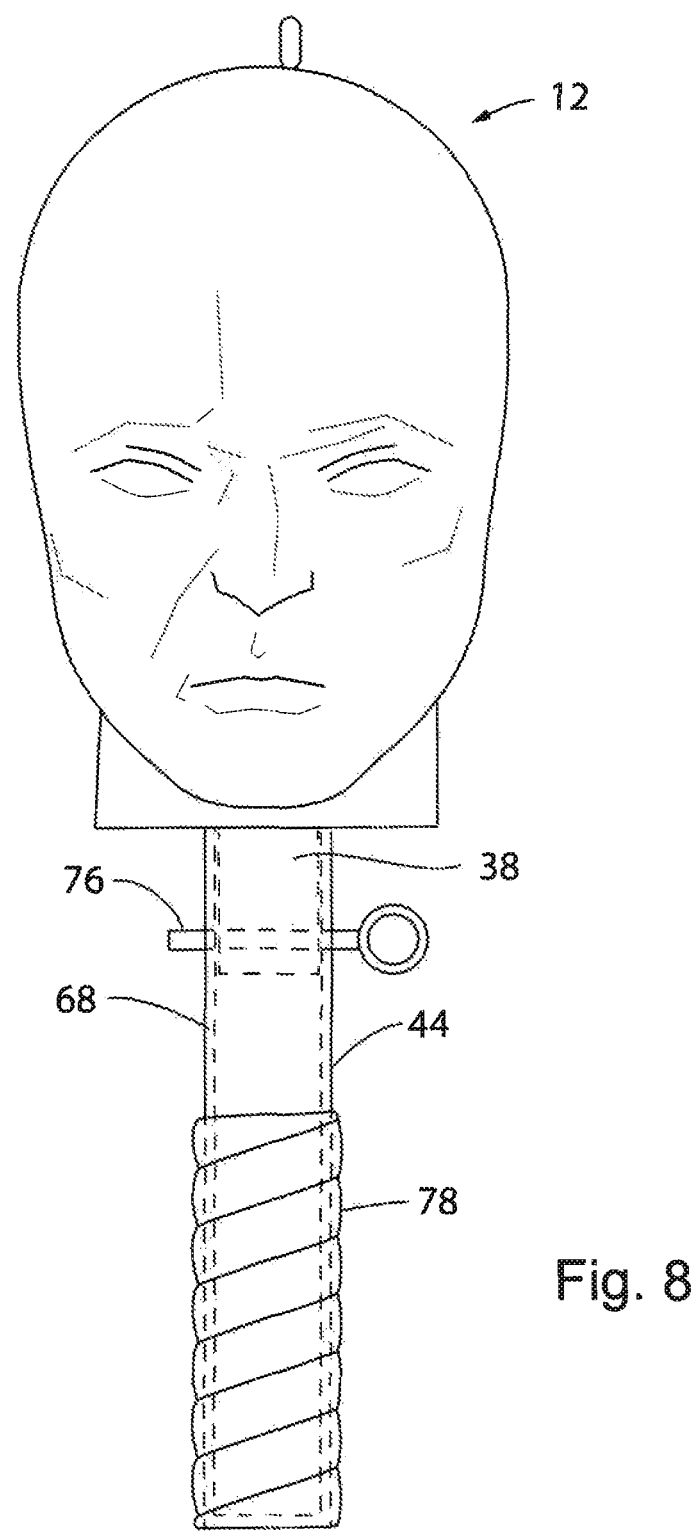
FIG. 8 is a front view of the head module of the modular training aid of FIG. 1 received within a handle.

Turning now to FIG. 8, the head module 12 in combination with the afore mentioned handle support 44 is shown in greater detail. The handle support 44 includes the receiving tube 68 discussed above, and may include a coating material or grip 78 surrounding the outer surface 80 of the receiving tube 68. In one embodiment of the handle support 44, the receiving tube 68 has a length sufficient for a user to hold the handle support 44 with either one or two hands. Accordingly, the receiving tube 68 has a length of approximately between 6 inches and 12 inches, and more preferably 9 inches.

Other handle options may be utilized as deemed beneficial in the commercial embodiment. For example, turning now to FIG. 9, an alternative extended handle 67 is shown which includes a receiving tube portion 69, a handle portion 71, and a spacer portion 73 that extends between the receiving tube portion 69 and the handle portion 71. As shown in the prior embodiments, a pin 76 may be used to secure the head connector bar 38 of the head module 12 or the leg connector bar 126 of the leg module 18 to the receiving tube portion 69. The receiving tube portion 68 is structurally similar to the receiving tube 68 of the handle support 44, as previously described.

Figure 9:
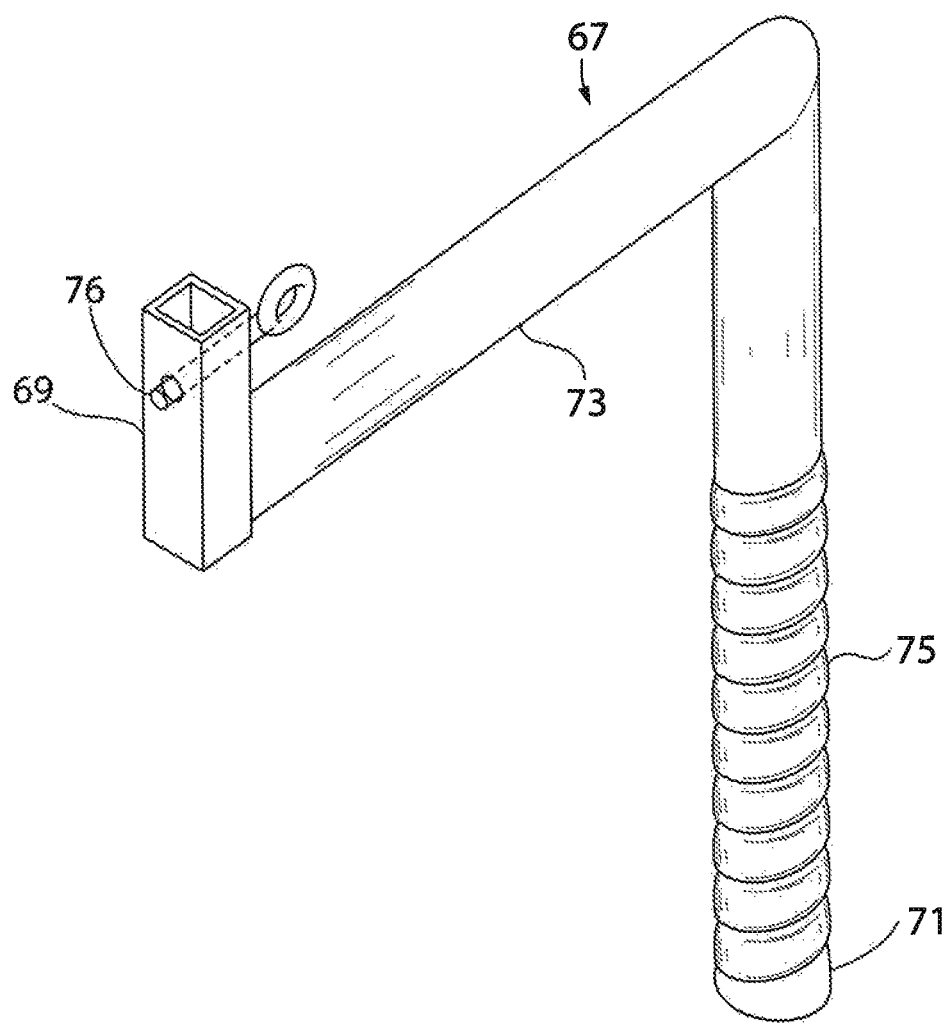
FIG. 9 is a front isometric view of one embodiment of an alternate handle that may be used with the head and legs modules.

The extended handle 67 as shown in FIG. 9 may be used to add additional space between a trainee strikes and the instructor holding the module 14, 18. Accordingly, the spacer portion 73 may have a total length of approximately between 8 and 17 inches, and more preferably 14 inches. The extended handle 67 may also have a width approximately between 8 and 14 inches, and more preferably 12 inches. In one embodiment of the extended handle 67, it is formed of three discrete tube segments that may be affixed together via welding or similar attachment, as is shown in FIG. 9. Alternatively, the extended handle 67 may be formed of a single piece of tubing this has been bent at an angle between the receiving tube portion 69 and the spacer portion 73, and bent at an angle between the spacer portion 73 and the handle portion 71. As previously described, the outer surface 75 of the extended handle 67 may be fully or partially covered by a padding or coating material. Furthermore, a grip 75 may surround the outer surface of the extended handle 67 at the handle portion 71 as shown.

Figure 10:
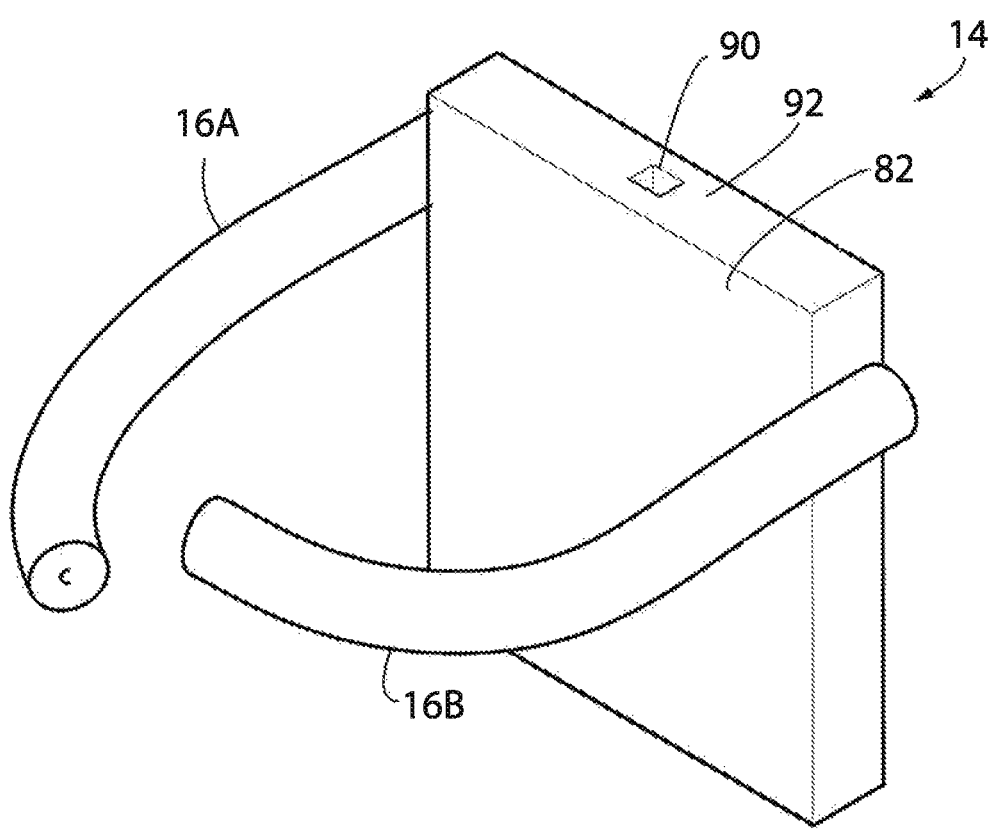
FIG. 10 is a front isometric view of the torso module of the modular training aid of FIG. 1.

Referring now to FIGS. 10-13, and initially FIG. 10, the torso module 14 with its first and second posable arms 16A, 16B, extending therefrom will be described in further detail. As shown in FIG. 10, the torso module 14 of the modular training device 10 is configured to anatomically represent the general size and shape of a human torso, including a chest 82, a first posable arm 16A, corresponding to a right arm, and a second posable arm 16B, corresponding to a left arm. The chest 82 and posable arms 16A, 16B of the torso module 14 are particularly well suited for receiving striking blows and being manually manipulated during striking, appendage manipulating, and restraining related training exercises. Furthermore, and as will be described in more detail below, both of the posable arms 16A, 16B are configured to be bendable or flexible as to conform to various desired positions during training exercises. They also should have sufficient stiffness to retain in a given posed position in the absence of any significant repositioning force.

Figure 11:
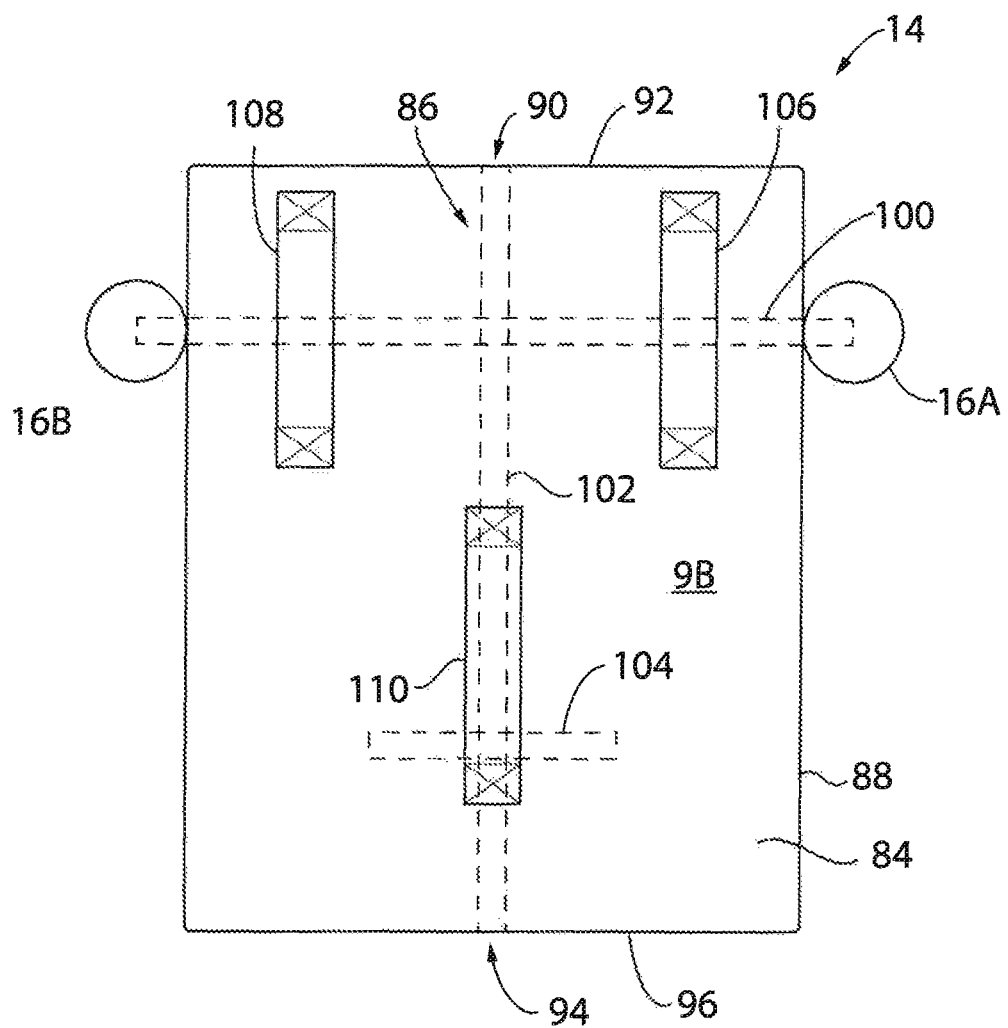
FIG. 11 is a rear view of the torso module of the modular training aid of FIG. 1.

Turning now to FIG. 11, in one embodiment of the present invention the torso module 14 is formed in-part of a flexible, semi-rigid foam body or pad 84, and preferably a low density, self-skinning foam, overlaying an inner torso frame 86 that will be described in further detail below. Alternatively, the pad 84 may be formed of a lightweight polymer or rubber-like material. Generally, human anatomical likeness of the modular training aid 10 may be improved through the use of a self-skinning foam body, arms, legs and head that are molded to represent the anatomical features of a human. In accordance with one embodiment of the present invention the foam body 84 of the torso module has a thickness of approximately 4 inches. The foam body 84 may be exposed, include an integrated outer skin coating, or alternatively, it may include a distinct surface covering 88, such as a vinyl covering that may be removable. As shown in FIG. 10, an upper access 90 within the top edge 92 of the foam body 84, may expose a portion of the inner torso frame 86 corresponding to a head module receiving tube 68, described above, such that a head module 12 may be removably attached to the top of the torso module 14. Similarly, a lower access 94 within the bottom edge 96 of the foam body 84, may expose a portion of the inner torso frame 86 structurally similar to the receiving tube 68, described above, such that a leg module 18 may be removably attached to the bottom of the torso module 14.

Still referring to FIG. 11, the rear surface 98 of the torso module 14 is shown with components of the inner torso frame 86 shown in broken lines. The torso frame 86 includes a first cross bar or shoulder bar 100 extending between the first posable arm 16A and the second posable arm 16B. A vertical support or spine tube 102 extend generally perpendicularly to the shoulder bar 100, at a midpoint between the two posable arms 16A, 16B and extends generally from the top edge 92 of the foam body 84 to the bottom edge 96 of the foam body 84. A second cross bar or stabilizer bar 104 extends generally perpendicular to the spine tube 102 and parallel to the shoulder bar 100, and is affixed to the spine bar 102 at a location between the shoulder bar 100 and the bottom edge 96 of the foam body 84. The stabilizer bar 104 is configured to reduce and/or inhibit rotation of the foam body 84 about the spine tube 102.

As was discussed above, foam body 84 of the torso module 14 may be exposed, include an integrated outer skin coating, or alternatively, it may include a distinct surface covering 88, such as a vinyl covering that may be removable. Still referring to FIG. 11, the rear surface 98 of the torso module 14, whether formed of an exposed foam body 84 or distinct surface covering 88 is configured to include a plurality of rearwardly extending external handles 106, 108, 110. As shown in illustrated embodiment of FIG. 11, the handles 106, 108, 110 may be attached to the cover 88 of the foam body 84. In one embodiment, at least one handle 106, 108 is located above at least one other handle 110, as to allow the user grasping the handles to adjust the angle and position of the torso module 14. When the modular training aid 10 is assembled to include the head module 12, torso assemble 14 and leg module 18, the approximate weight of the modular training aid 10 is between 2 lbs. and 40 lbs., and more preferably 30 lbs. As such, the entire modular training aid 10 may be wholly supported by a user grasping the handles 106, 108, 110 without having to use a stand, base or other mounting support. Alternatively, as will be described in further detail below, the modular training aid 10 may be selectively supporting by a stand, base or mount when desired.

Figure 12:
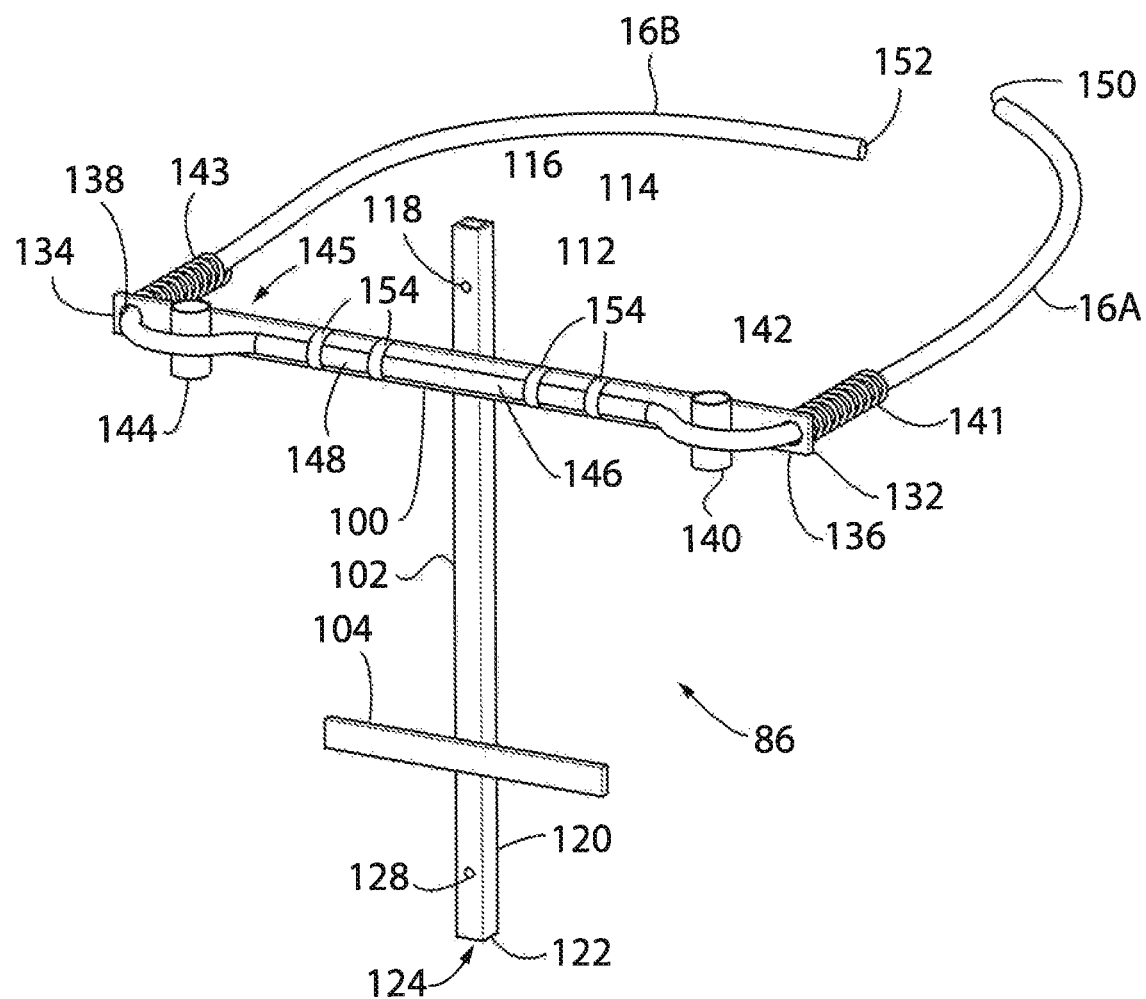
FIG. 12 is a rear isometric view of the frame of the torso module of the modular training aid of FIG. 1.
Figure 13:
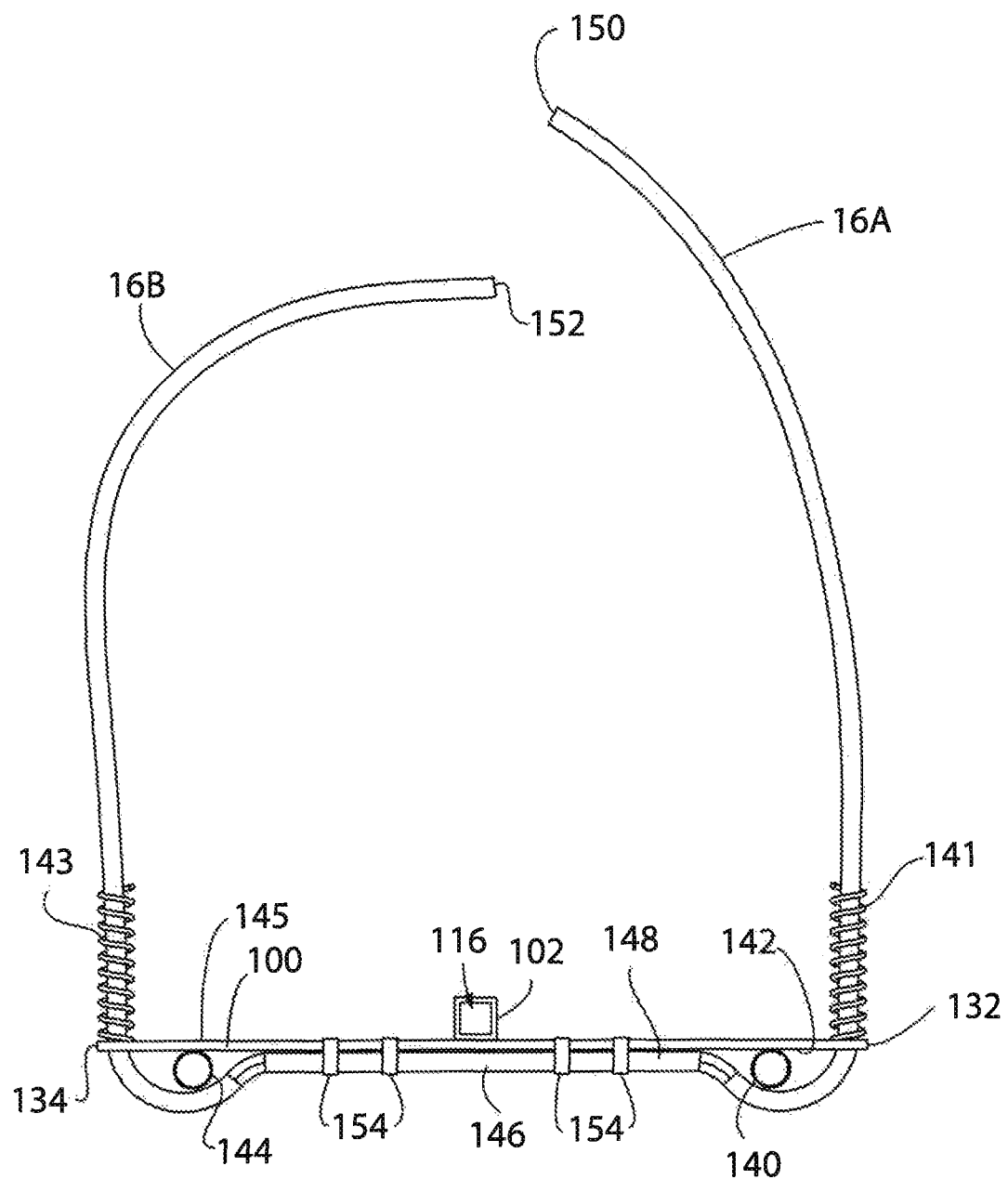
FIG. 13 is a top view of the frame of the torso module of the modular training aid of FIG. 1.

Referring now to FIGS. 12 and 13, the inner torso frame 86 is shown without the surrounding foam body 84. As was previously discussed, the shoulder bar 100, spine tube 102, and stabilizer bar 104 are welded together to form the inner torso frame 86. The upper portion of the spine tube 102 is structurally generally identical to the receiving tube 68 of the head module handle support 44. That is to say that the upper portion of the spine tube 102 defines a receiving portion 112, including a wall 114, and a cavity 116 defined within the wall 114. The cavity 116 is sized to slidably receive the head connector bar 38 within the receiving portion 112 of the spine tube 102. One of more apertures 118 located in the wall 114 of the receiving portion 112 are oriented to overlap with the apertures 48 of the head connector bar 38. In this configuration, a locking pin 76 may be passed between both sets of apertures 48, 118 in order to releasable connect the head connector bar 38 to the receiving portion 112 of the spine tube 102.

The opposing lower end of the spine tube 102 also includes a similar structure for releasably affixing the leg module 18 to the torso module 12. The structure may include an interchangeable mounting arrangement of the type described above with the head. It thus may include a receiving portion 120 including a wall 122, and a cavity 124 defined within the wall 122. The cavity 124 is sized to slidably receive a leg connector bar 126 within the lower receiving portion 120 of the spine tube 102. One of more apertures 128 located in the wall 122 of the lower receiving portion 120 are oriented to overlap with the apertures 130 of the leg connector bar 126, as to receive a locking pin therein.

Turning now to the shoulder bar 100, the shoulder bar 100 extends from a first end 132, adjacent the first posable arm 16A, to a second end 134, adjacent the second posable arm 16B. The shoulder bar includes a first aperture 136 adjacent the first end 132 and a second aperture 138 adjacent the second end 134. A first bend relief tube 140 is positioned along the rear surface 142 of the shoulder bar 100, adjacent the medial edge of the first aperture 136, and an opposing second bend relief tube 144 is positioned along the rear surface 142 of the shoulder bar 100, adjacent the medial edge of the second aperture 138. The relief tubes 140, 144 are preferably cylindrical as shown in FIG. 12, but are not limited to such a configuration. Additionally, in one embodiment of the present invention, a first spring guide 141 and a second spring guide 143 are affixed to the front surface 145 of the shoulder bar 100 in a configuration such that the first spring guide 141 is a helical spring having a central cavity in line with the first aperture 136, and the second spring guide 143 is a helical spring having a central cavity in line with the second aperture 138. The spring guides 141, 143 may be welded or brazed to the front surface 145 of the shoulder bar 100. It should be noted this spring does not serve the purpose of returning the arm to an original starting position. Rather the spring guide serves as a support to disperse force from the arms 16A, 16B and bar 132 at intersection point 136 and 138 respectively, while the arm 16A, 16B is in use or being manipulated. The spring guides 141, 143 are positioned to maintain the arm in a neutral position, i.e., a generally linear position that extends generally perpendicular to the corresponding bar 100. While it should be understood that the first and second posable arms 16A, 16B may be posed in an alternative position, the referenced neutral position is one that extends generally perpendicular to the corresponding frame.

The first and second posable arms 16A, 16B are formed of an elongated length of a flexible or bendable core or malleable material such as a wire 146 that exhibits minimal physical memory, which is to say that the core generally does not kink or crease in response to an applied bending force. The core may be formed of aluminum or aluminum alloy wire, having a tensile strength of approximately 200000 psi to 500000 psi, and more preferably at-least 300000 psi. In a preferred embodiment, a single length 148 of wire 146 extends from an outer end 150 of the first posable leg 16A, along the rear surface 142 of the shoulder bar 100, and terminates at the outer edge 152 of the second posable arm 16B. In this configuration, the length 148 of wire 146 passes from the first posable arm 16A through the first spring guide 141, the first aperture 136, around the outer surface of the first bend relief tube 140, along the rear surface 142 of the shoulder bar 100, around the outer surface of the second bend relief tube 144, through the second aperture 138, through the second spring guide 143, and to the second posable arm 16B. The continuous length 148 of wire 146 may be affixed at various locations to the shoulder bar 100 by mechanical clamps 154 or other fixation devices. In one embodiment of the present invention, the arms 16A, 16B have a length sufficient to represent anatomically accurate arms, approximately preferably between 22 inches and 30 inches, and more preferably approximately between 24 inches and 27 inches. More preferably, as will be described in further detail below, the arms 16A, 16B will have a length sufficient for them to be positioned behind the rear surface 98 of the body 84 of the torso module 14, such that in use various arm restraint and or handcuffing techniques may be employed. In use, the flexible spring guides 141, 143 and the bend relief tubes 140, 144 prevent the wire 146 from excessive bending at or around the apertures 136, 138 when the posable arms 16A, 16B are bent or manipulated and will be described in further detail below.

Figure 14:
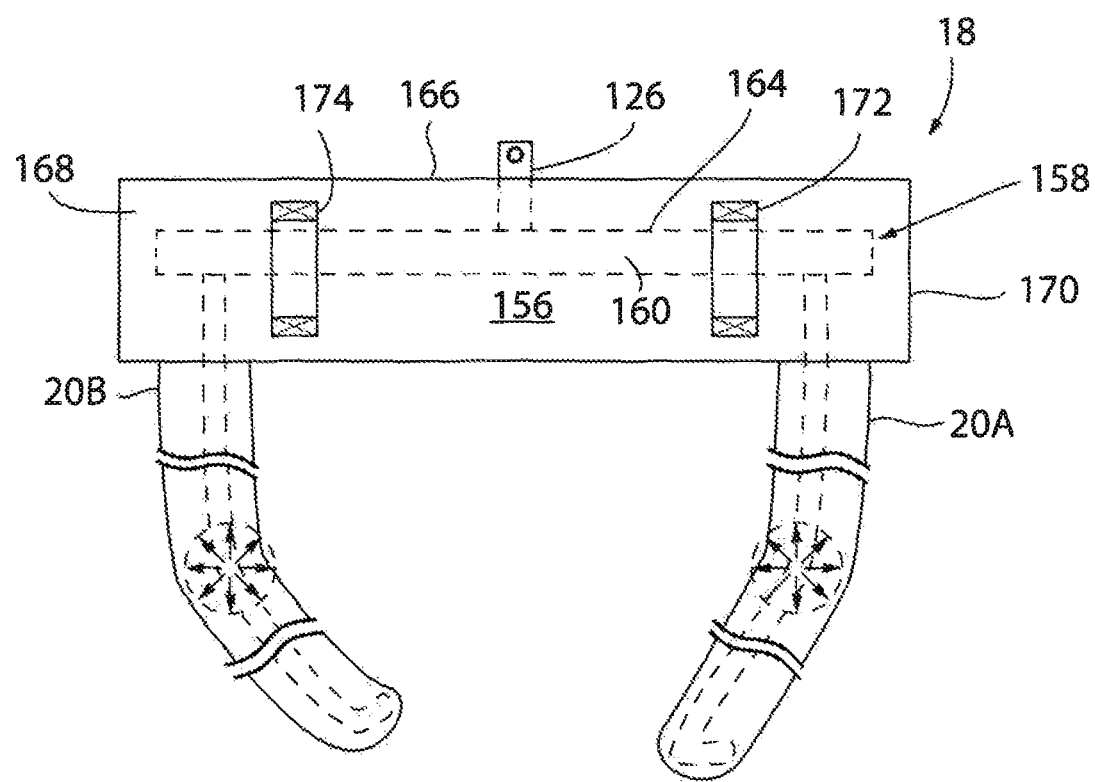
FIG. 14 is a rear view of the flexible leg module of the training aid of FIG. 1.

Referring now to FIG. 14, the rear surface 156 of the leg module 18 is shown with components of the inner leg frame 158 shown in broken lines. The leg frame 158 includes a first cross bar or pelvis bar 160 extending between the first posable leg 20A and the second posable leg 20B. A leg connector bar 126, as was previously described, extend generally upwardly and perpendicularly to the pelvis bar 160, at a midpoint between the two posable legs 20A, 20B and extends generally from the top edge 164 of the pelvis bar 160 past the top edge 166 of the foam pad 168 that surrounds the leg frame 158, such that a portion of the leg connector bar 126 is exposed above the foam pad 168.

The foam pad 168 of the leg module 18 may be exposed, include an integrated outer skin coating, or alternatively, it may include a distinct surface covering 170, such as a removable vinyl covering, as was described above. Still referring to FIG. 14, the rear surface 156 of the leg module 18, whether formed of an exposed foam body 168 or distinct surface covering 170 is configured to include a plurality of rearwardly extending external handles 172, 174. As shown in illustrated embodiment of FIG. 14, the handles 172, 174 may be attached to the cover 170 of the foam body 168. In one embodiment, the handles 172, 174 may be spaced apart from one another, as to allow the user grasping the handles 172, 174 to adjust the angle and position of the leg module 18. In addition, the leg module 18 may also be used individually with the support of the handle support 44 (shown in FIG. 8) or the extended handle 67 (shown in FIG. 9).

Figure 15:
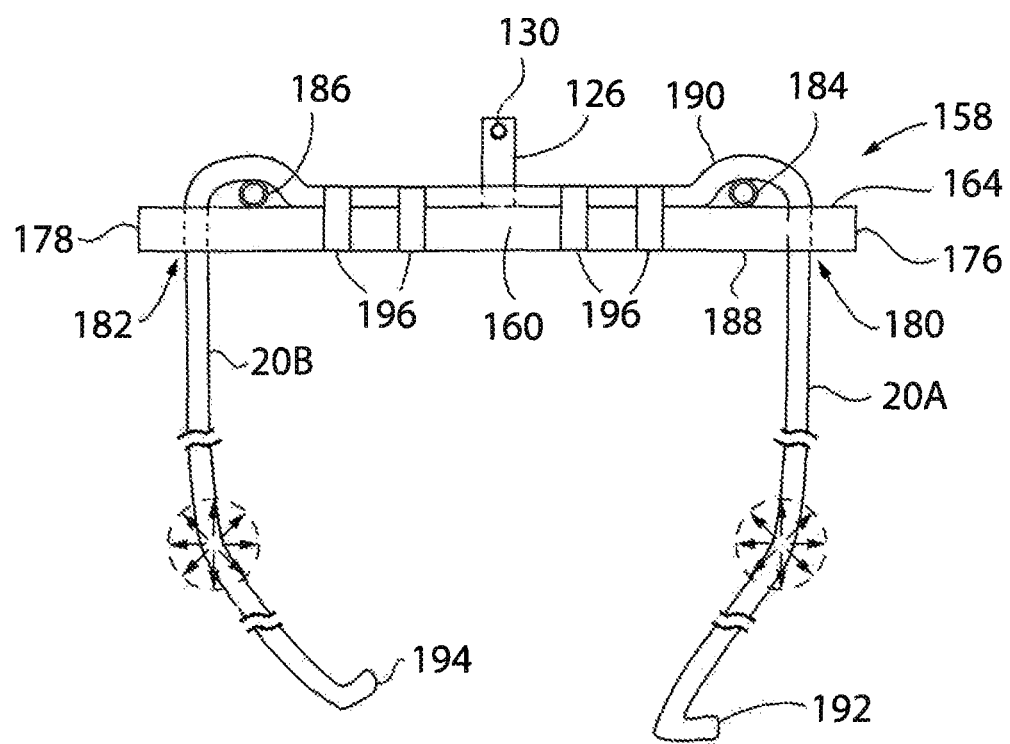
FIG. 15 is a rear view of the frame of the flexible leg module of the training aid of FIG. 1.

Referring now to FIG. 15, the inner leg frame 158 is shown without the surrounding foam body 168. As will become apparent in the following discussion, the module of the leg frame 158 with its pelvis bar 164 and two posable legs 20A, 20B is generally similar to the previously discussed module of the shoulder bar 100 and two posable arms 16A, 16B.

The pelvis bar 160 extends from a first end 176, adjacent the first posable leg 20A, to a second end 178, adjacent the second posable leg 20B. The pelvis bar 160 includes a first aperture 180 adjacent the first end 176 and a second aperture 182 adjacent the second end 178. A first bend relief tube 184 is positioned along the upper edge 164 of the pelvis bar 160, adjacent the medial edge of the first aperture 180, and an opposing second bend relief tube 186 is positioned along the upper edge 164 of the pelvis bar 160, adjacent the medial edge of the second aperture 182. The relief tubes 184, 186 are preferably cylindrical as shown in FIG. 15, but are not limited to such a configuration. Additionally, in one embodiment of the present invention, not shown, a first spring guide and a second spring guide may be affixed to the bottom edge 188 of the pelvis bar 160 and extend downward therefrom in a configuration such that the first spring guide is a helical spring having a central cavity in line with the first aperture 180 and the second spring guide is a helical spring having a central cavity in line with the second aperture 182. The spring guides may be welded or brazed to the bottom edge 188 of the pelvis bar 160.

The first and second posable legs 20A, 20B are formed of an elongated length of a flexible or bendable core material such as a wire 190. In a preferred embodiment, a single length of wire 190 extends from an outer end 192 of the first posable leg 20A, along the upper edge 164 of the pelvis bar 160, and terminates at the outer edge 194 of the second posable leg 20B. In this configuration, the length of wire 190 passes from the first posable leg 20A through the optional first spring guide, the first aperture 180, around the outer surface of the first bend relief tube 184, along the upper edge 164 of the pelvis bar 160, around the outer surface of the second bend relief tube 186, through the second aperture 182, through the optional second spring guide, and to the second posable leg 20B. The continuous length of wire 190 may be affixed at various locations to the pelvis bar 160 by mechanical clamps 196 or other fixation devices. In one embodiment of the present invention, the legs 20A, 20B have a length sufficient to represent anatomically accurate legs, approximately preferably between 32 inches and 36 inches, and more preferably approximately between 30 inches and 40 inches. In use, the optional flexible spring guides and the bend relief tubes 184,186 prevent the wire 190 from excessive bending at or around the apertures 180,182 when the posable legs 20A, 20B are bent or manipulated and will be described in further detail below.

Additionally, still referring to FIG. 15, the leg connector 126, as was previously described, is shown including aperture 130, which is configured to be received within and releasably affixed to lower end of the spine tube 102 of the torso module 12.

Turning now to FIGS. 16 and 17, a detailed view of an exemplary posable appendage 195 according to one embodiment of the present invention, which may be selected from the posable arms 16A, 16B and posable legs 20A, 20B, is shown. Referring initially to FIG. 16, in this representative illustration, the posable appendage 195, (which may correspond to arm 16A, 16B, or leg 20A, 20B) is shown extending from its corresponding support bar 197, (which may correspond to shoulder bar 100 or pelvis bar 160, respectively). In accordance with one embodiment of the present invention, the wire 199, (which may correspond to wire 146, 190), that forms the posable appendage 195 may have a diameter of between 0.25 inches and 0.5 inches, and more preferably a diameter between 0.32 inches and 0.40 inches. In accordance with one embodiment of the present invention, the wire 199 that forms the posable appendage 195 may be an American Wire Gauge (AWG) No. 00 "two aught" wire, having an approximate diameter of 0.36 inches. In one embodiment, the wire 199 may be formed of generally aluminum or an alloy thereof, however other malleable materials and other sizes, which are well suited for bending without breaking or kinking, are well within the scope of this invention. Furthermore, other wires or posable materials that allow the appendage 195 to be posed and manipulated generally without undue bending or kinking are considered within the scope of this invention. A flexibly or bendable coating or wrapping 201 may also surround the outer surface of the core of wire 199, along its length.

In use, the possible appendages, such as posable arms 16A, 16B, once place in a user-selected position are passively retained in that user-selected position until a force is applied, which is to say that gravity alone will not alter the user-selected position of the appendage absent an additional applied force. As such, the appendages of the training aid 10 may be posed, i.e., bent, twisted, or otherwise manipulated, into a desired position that is then passively maintained, until a sufficient force is applied to overcome the previously posed position. The force applied to overcome the posed position may be either re-posing the appendage, or applied view striking or engaging the appendage during the course of the training exercise.

Still referring to FIG. 16, the length of the exemplary posable appendage 195 shown in FIG. 16 is divided into four subsections: A, B, C and D. Subsection "A" defines a length of the exemplary posable appendage 195 directly adjacent the corresponding support bar 197 and may include a spring guide 141, 143 surrounding the wire 199, as was previously described.

As shown in FIG. 16, subsection "B" defines an upper length of the posable appendage 195, such as an upper arm in posable arms 16A, 16B and upper leg in posable legs 20A, 20B. Subsection "B" differs from that of subsection "A" to the extent that it may include a first shield 196 surrounding the wire 199. The first shield 196 may be formed of a rigid or semi-rigid cylindrical material such as a PVC tube, or like material that inhibits movement of the wire 196 along the length of subsection "B". In one embodiment of the present invention, in which the first shield 196 is present, the corresponding posable appendage 195 will exhibit a more realistic range of movement, as bending of the wire 199 will not occur along the length of subsection "B".

Following subsection "B", a third length of the posable appendage 195, identified as subsection "C," will represent a length of the posable appendage 195 corresponding to an elbow in posable arms 16A, 16B and a knee in posable legs 20A, 20B. That is to say, that subsection "C" will not include a movement inhibiting shield around the exterior of the wire 199, such that the wire 199 will be provided a full range of motion along the length of subsection "C".

Finally, subsection "D)" may extend from subsection "C" to the end of the posable appendage 195. Subsection "D" will correspond to a forearm in posable arms 16A, 16B and a shin in posable legs 20A, 20B. As with subsection "B", subsection "D" includes a second shield 198 surrounding the wire 199. The second shield 198 may be formed of a rigid or semi-rigid cylindrical material such as a PVC tube, or like material that inhibits movement of the wire 199 along the length of subsection "D". In one embodiment of the present invention, in which the second shield 198 is present, the corresponding posable appendage 195 will exhibit a more realistic range of movement, as bending of the wire 199 will not occur along the length of subsection "D".

Still referring to FIG. 16, the subsection "A" may be attached to the first shield 196 of subsection "B" by way of a coating 200 that extends over the surface of the wire 199 at subsection "A" and overlaps with and connects to a portion of the first shield 196 at subsection "B". In one embodiment of the present invention the coating 200 may be a heat shrink tube with an adhesive lined inner surface. When constricted, the coating 200 will prevent the first shield 196 from sliding relative to subsection "A." Similarly, a coating 202 may extend over the surface of the wire 199 at subsection "C" and overlap with and connect to a portion of the first shield 196 at subsection "B" and the second shield 198 at subsection "D". Again, coating 202 may be a heat shrink tube with an adhesive lined inner surface that prevents the first and second shields 196, 198 from sliding along the length of the exemplary posable appendage 195. A cross-sectional view of the overlapping portion of subsection "C" and subsection "D" is shown in FIG. 17.

A foam tube 204, and preferably an elastomeric polymer-based foam such as ethylene vinyl acetate (EVA) foam, may extend the entire length of the posable appendage 195, as was described in proceeding description of the torso module 16 and leg module 18. In one embodiment, a removable coating 206 such as a vinyl or cloth cover and an end cap 208 may also be placed over the foam tube 204 and surround the outer surface of the posable appendage.

In an embodiment of modular training aid 10, where the exemplary posable appendage 195 shown in FIG. 16 is the posable arm 16A, 16B: section "A" may have a length of approximately 2 inches to 8 inches and more preferably 3 inches to 5 inches; section "B" may have a length of approximately 4 inches to 24 inches and more preferably 6 inches to 10 inches; section "C" may have a length of approximately 1 inch to 6 inches and more preferably 2 inches to 4 inches; and section "D" may have a length of approximately 5 inches to 15 inches and more preferably 8 inches to 10 inches.

Alternatively, in an embodiment of modular training aid 10, where the exemplary posable appendage 195 shown in FIG. 16 is the posable leg 20A, 20B, section "A" may have a length of approximately 2 inches to 8 inches and more preferably 3 inches to 5 inches; section "B" may have a length of approximately 12 inches to 30 inches and more preferably 14 inches to 20 inches; section "C" may have a length of approximately 1 inch to 6 inches and more preferably 2 inches to 4 inches; and section "D" may have a length of approximately 5 inches to 20 inches and more preferably 9 inches to 13 inches.

Figure 18:
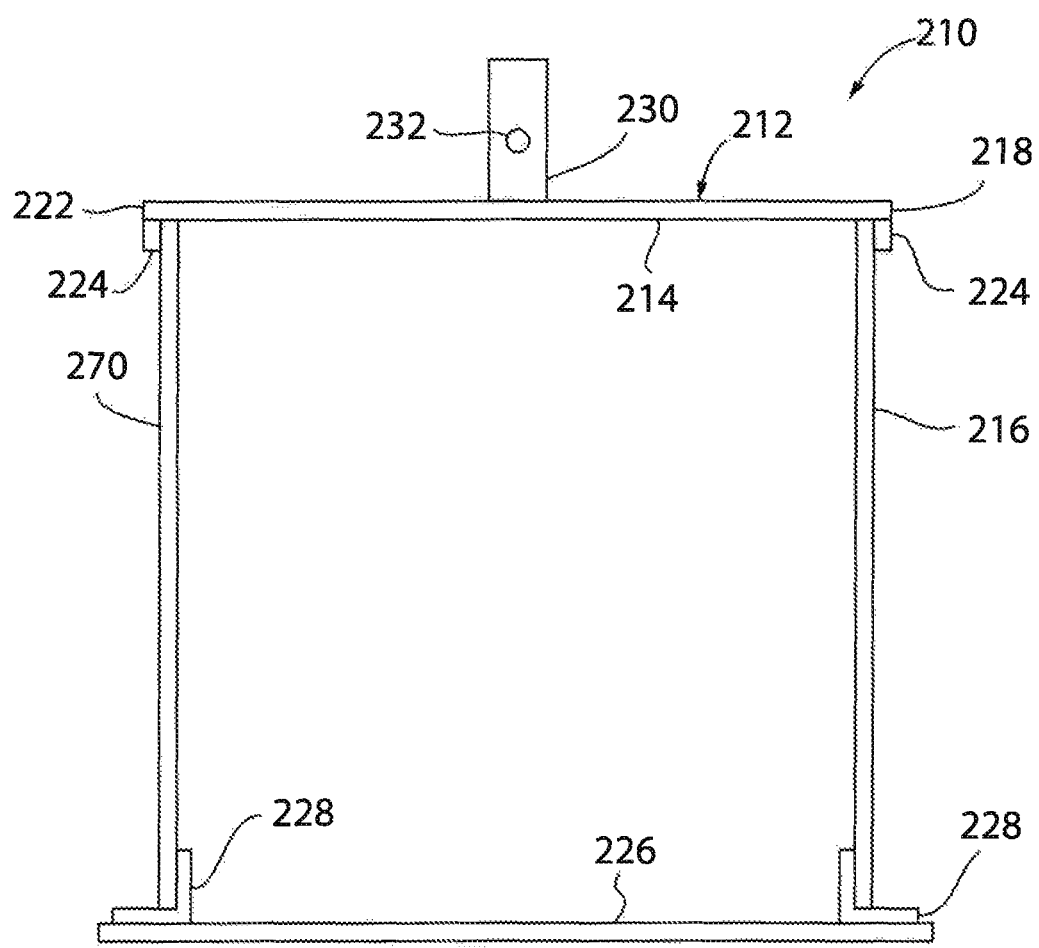
FIG. 18 is a front view of the frame of the fixed leg module according to an alternative embodiment of the modular training aid of FIG. 1.

Turning now to FIG. 18, in an alternative configuration of the modular training aid 10 according to the present invention, the torso module 12 may be affixed to a fixed leg module 210. The fixed leg module 210 functions as a rigid stand for receiving the torso module 14, and does not include the posable legs 20A, 20B of leg module 18. Rather than the posable legs 20A, 20B described above in the frame 158 of leg module 18, the alternative fixed leg module 210 includes a frame 212 includes a pelvis bar 214, a first fixed leg 216 extending downwardly from the first end 218 of the pelvis bar 214 and a second fixed leg 220 extending from a second end 222 of the pelvis bar 214. Brackets 224 may assist in securing the fixed legs 216, 220 to the pelvis bar 214. The fixed legs 216, 220 extend downwardly to a base plate 226 having a length generally equal to that of the pelvis bar 214. Again, brackets 228 may assist in securing the fixed legs 216, 220 to the base plate 226. In this alternative embodiment, a leg connector 230, similar to the leg connector 126 as was previously described, is shown including an aperture 232, which is configured to be received within and releasably affixed to lower end of the spine tube 102 of the torso module 14. In this configuration of the modular training aid 10, the head module 12, torso module 14 and fixed leg module 210 may be connected to the fixed leg module 210, which will support the weight of the modular training aid 10 over the area of the base plate 226. That is to say that use of the fixed leg module 210 will allow the modular training aid 10 to stand free of external support. Alternatively, the base plate 226 may be configured to engage a carrier, which can be mounted on a fixed stand, mechanically movable support or a motorized carrier device described below.

Figure 19:
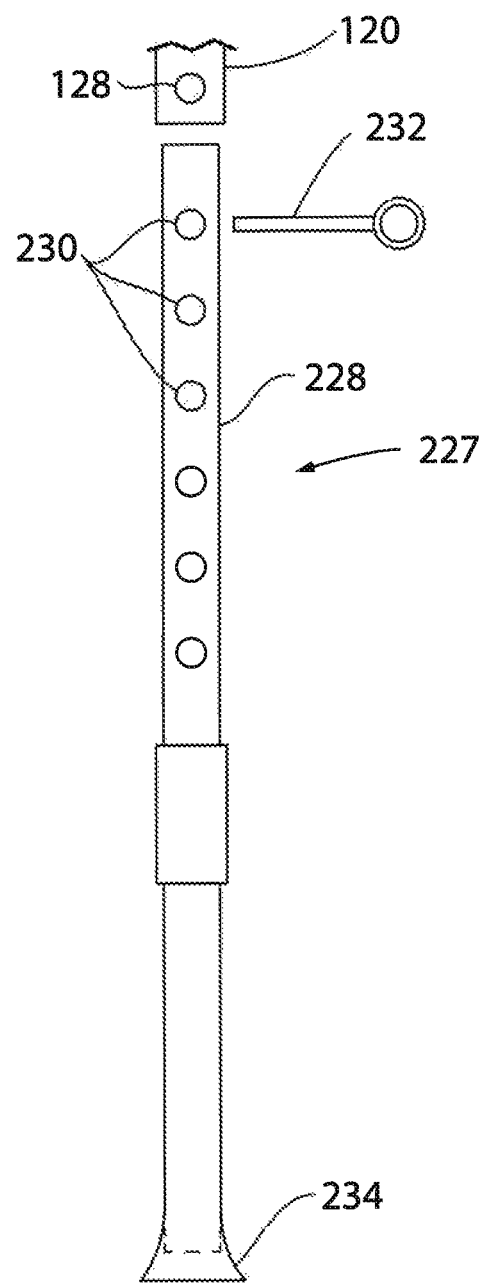
FIG. 19 is a front view of a mono-pole stand according to one embodiment of the modular training aid of FIG. 1.

Turning now to FIG. 19, in yet another alternative embodiment of the present invention, a mono-pole support 227 is shown which may support the head module 12, by way of an adapter (not shown) or the torso module 14 of the modular training aid 10. The mono-pole support 227 includes a central rod 228 including one or more apertures 230 located about its length. As with the previously discussed leg connector 126, the rod 228 is configured to be received within and releasably affixed to lower end of the spine tube 102 of the torso module 14. A locking pin 232 of an interchangeable mounting arrangement may travel through the aperture 128 of the spine tube 102 and the user selected aperture 230 of the central rod 228 to secure the torso module 12 to the mono-pole support 227. The height of the mono-pole support 227 in use may be altered by the user selected aperture 230. Furthermore, an anti-skid pad 234 extending from the bottom of the central rod 228 may inhibit skidding of the modular training aid 10, when the weight of the assembled head module 12 and torso module 14 are supported by the mono-pole support 227, and particularly in kicking or other striking exercises when the modular training aid 10 is held at a distance from the instructor.

Figure 20A:
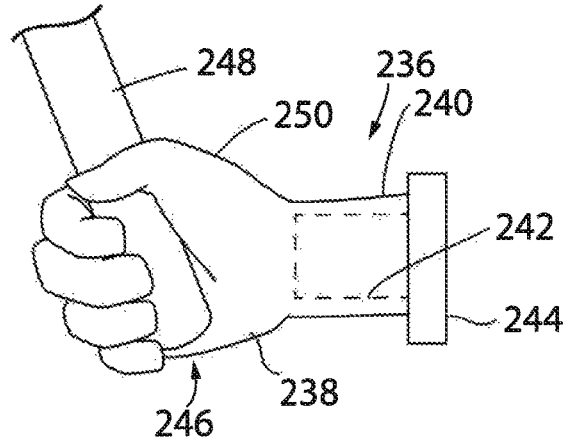
FIG. 20A is a side view of the hand module retaining a simulated weapon according to an alternative embodiment of the modular training aid of FIG. 1.
Figure 21:
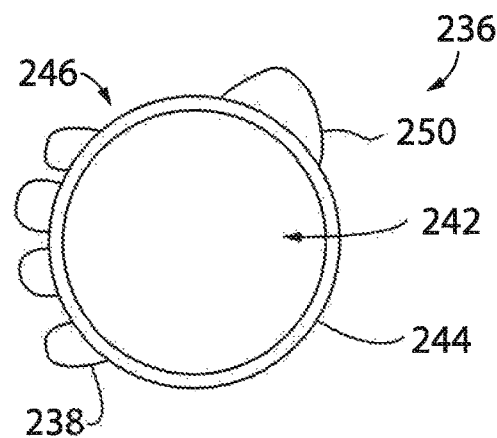
FIG. 21 is a rear view of the hand module of FIG. 19.

Turning now to FIGS. 20A,-21, and initially FIGS. 20A and 21 a removably hand module 236, in accordance with one embodiment of the present invention is shown. The hand module 236 includes a hand 238 and a wrist 240. The wrist 240 is preferably partially hollow as to allow an end 150, 152 of a posable arm 16A, 16B to be received within the hollow void 242. A fastener 244, such as a hook and loop strap may extend from the wrist 240 as to ensure that the hand module 236 remains in contact with the arm 16A, 16B. In one embodiment of the present invention the hand 238 may be molded into a preformed shape, for example a grasping gesture that defines a slot 246. The slot 246 may be configured as to receive and retain a simulated training tool 248, such as a weapon, or any other hand-held implement, for use in various training exercises. In one embodiment of the present invention the hand module 236 is formed of a flexible, semi-rigid foam, or lightweight polymer and preferably a low density, self-skinning foam, with the anatomical hand features being cut from or integrally molded to the outer surface 250 of the foam. Additionally, the hand 238 may be a reversible hand module 236, which can be interchangeably applied to either posable arm 16A, 16B for engagement by users during training exercises.

Figure 20B:
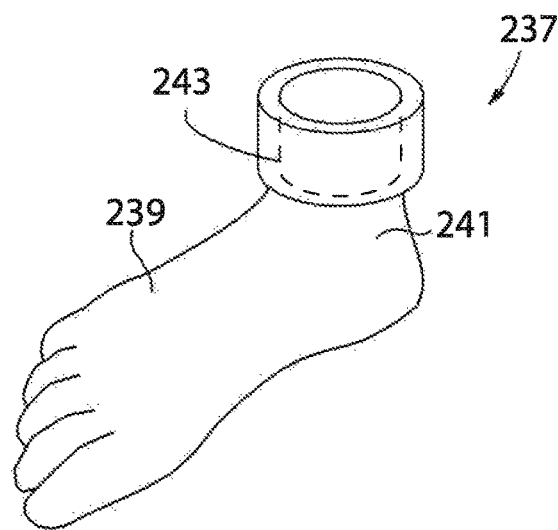
FIG. 20B is an isometric view of a foot module according to an alternative embodiment of the present invention of the training aid of FIG. 1.

As shown in FIG. 20B, a removable foot module 237, in accordance with one embodiment of the present invention is also shown, generally consistently with the hand module 236 described above. The foot module 237 includes a foot 239 and an ankle 241. The ankle 241 is preferably partially hollow as to allow an end 192, 194 of the posable legs 20A, 20B to be received within the hollow void 243. The foot module 237 may be attached to the possible legs 20A, 20B, in a similar manner as was described above regarding the hand module 236. Additionally, the foot 239 may be a reversible foot module 237, which can be interchangeably applied to either posable leg 20A, 20B for engagement by users during training exercises.

Figure 22:
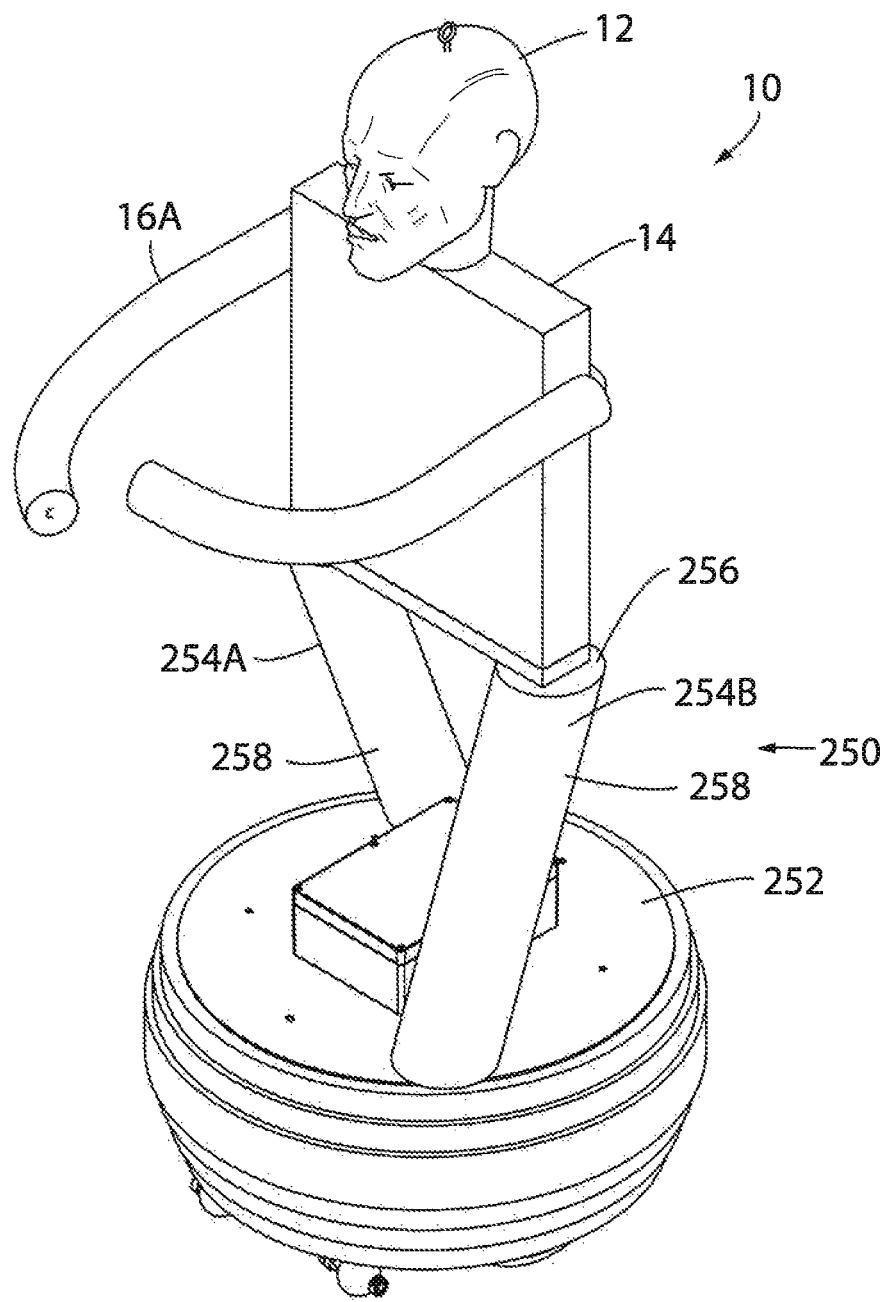
FIG. 22 is a front isometric view of an alternative embodiment of the modular training aid of FIG. 1, including a torso affixed to a mobile base.
Figure 23:
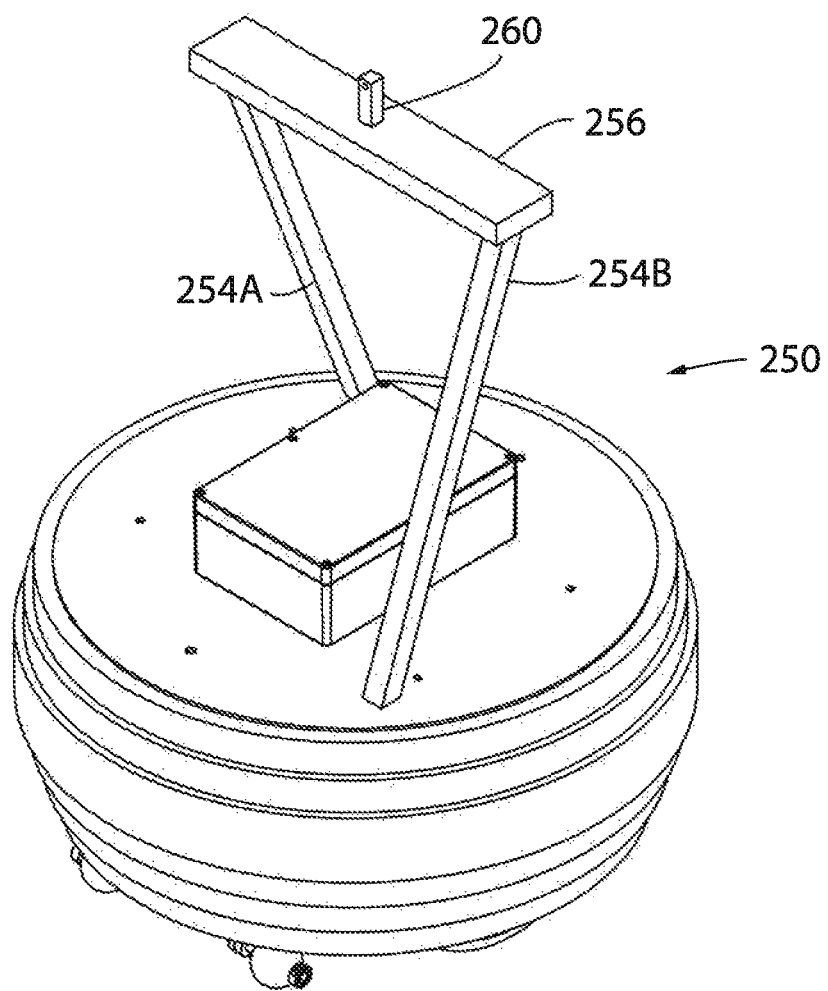
FIG. 23 is a front isometric view of the mobile base and frame of the torso of the modular training aid of FIG. 22.
Figure 27:
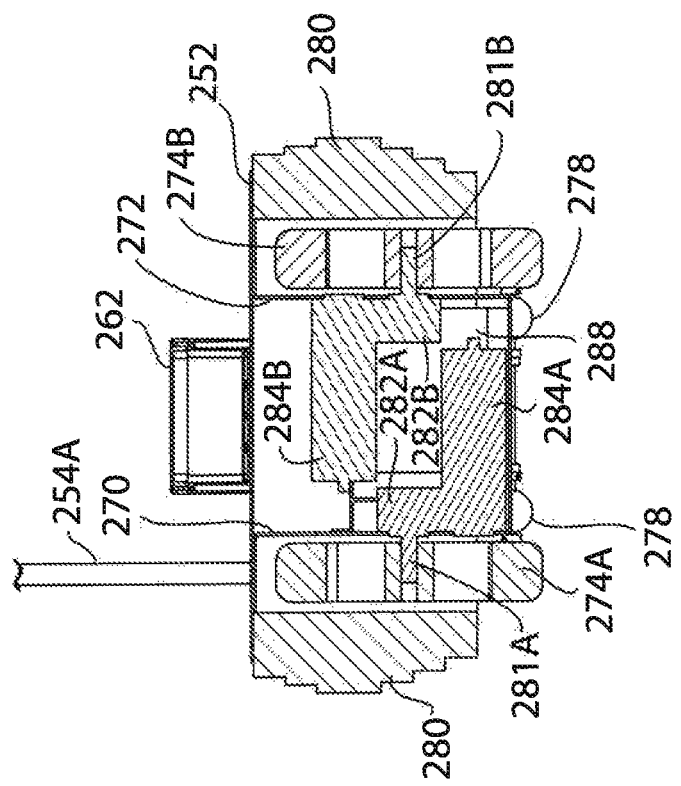
FIG. 27 is a front cross-sectional view of the mobile base of FIG. 22.
Figure 26:
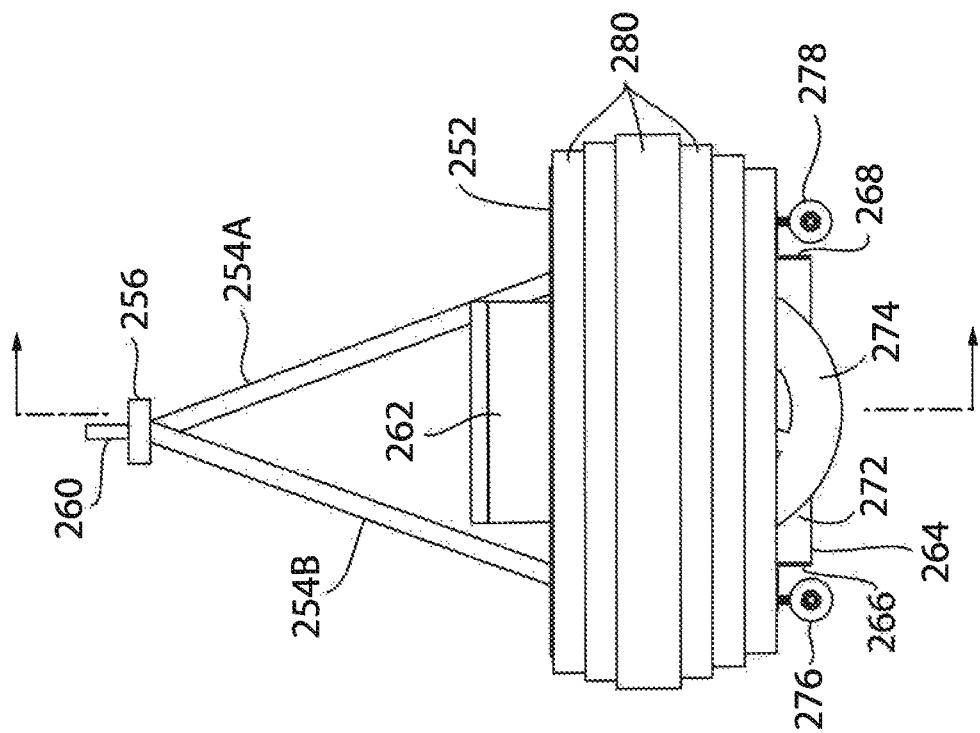
FIG. 26 is a side view of the mobile base of FIG. 22.

Turning now to FIGS. 22-27, and initially FIGS. 22 and 23, in accordance with yet another alternative embodiment of the present invention, the head module 12 and torso module 14 of the modular training aid 10, as previously described, may be affixed to a robotic base 250. As shown in FIGS. 22 and 23, the robotic base 250 includes an upper surface 252. Extending upwardly from the upper surface 252 are a first and second support legs 254A, 254B, which are affixed at their upper edge to a pelvis bar 256. Unlike the fixed leg module 210 that is described above and illustrated in FIG. 18, the support legs 254A, 254B of the robotic base 250 to not extend perpendicular to the pelvic bar 256. Rather, as shown in FIG. 22 with surrounding foam 258, and in FIG. 23 without foam 258, the support legs 254A, 254B each extend downwardly at opposing acute angles relative to the pelvic bar 256. The opposing angles of the support legs 254A, 254B provides for a great base of support and improved stability of the modular training aid 10 when mounted on the robotic base 250.

The pelvic bar 256 is similar to those described above, in that it includes a generally centrally located upwardly extending leg connector 260, as was previously described, and is configured to be received within and releasably affixed to lower end of the spine tube 102 of the torso module 12 by means of a locking pin 232 or alternative fastening means. In this configuration of the training aid 10, the head module 12 and torso module 14 may be connected and the weight of the modular training aid 10 can be supported on the ground via the robotic base 250.

Turning now to FIGS. 24-27, the robotic base 250 is shown in further detail, including: an upper housing 262 extending upwardly from the surface 252 and between the support legs 254A, 254B, a lower housing 264 extending downwardly from the surface 252 having a front 266, a rear 268, and first and second opposing sides 270, 272. A first wheel 274A is positioned outwardly of the first side 270 of the lower housing 264, and a second wheel 274B is positioned outwardly of the second side 272 of the lower housing 264. One or more front casters 276 may extend outwardly from the front 266 of the lower housing 264, while one or more rear casters 278 may extend outwardly from the rear 268 of the lower housing 264. One or more sections 280 of foam or similarly resilient material may extend about the periphery of the robotic base 250, generally at a level below the upper surface 252, such that the wheels 274A, 274B, casters 276, 278 and lower housing 264 are generally positioned inwardly of the sections of foam 280.

At the lower housing 264, a first axle 281A extends from the first wheel 274A, and passes through the first side 270 into the lower housing 264 where it rotationally engages a first gear assembly 282A that is driven by a first DC motor 284A. Similarly, on the opposite side of the lower housing 264, a second axle 281B extends from the second wheel 274B, and passes through the second side 272 into the lower housing 264 where it rotationally engages a second gear assembly 282B that is driven by a second DC motor 284B. A controller 286, which is configured to receive RF instructions from a remote-control device, are positioned within the upper housing 262, and are in electrical connection with the first and second DC motors 284A, 284B and a power source 288, such as one or more batteries located within the lower housing 264.

Figure 28:
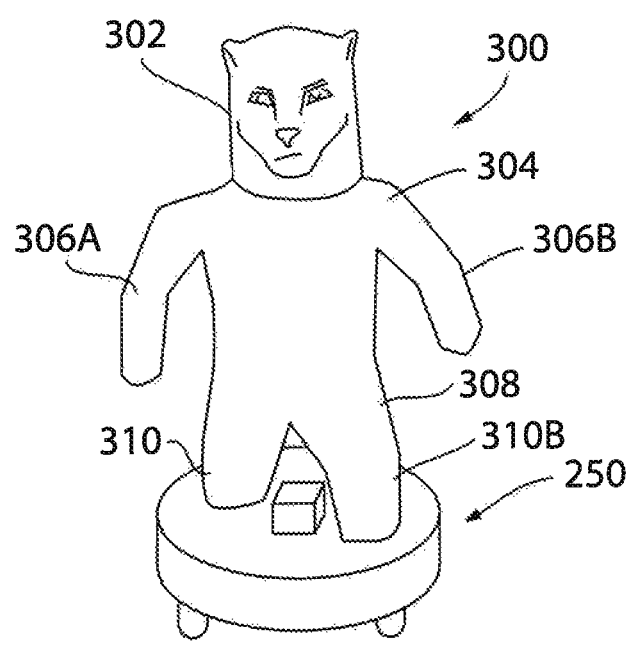
FIG. 28 is a front isometric view of an alternative embodiment of the modular training aid of FIG. 22, in which the modular training aid is in the form of an animal.

Turning to FIG. 28, in accordance with yet another alternative embodiment of the present invention, an alternative form of the training aid of the present invention is shown in which the aid is an animal configured training aid 300. The animal configured training aid 300 as shown in FIG. 28 may take the shape of any non-human animal, and include a releasable head module 302 and releasable torso module 304, having posable arms 306A, 306B, generally as previously described. The releasable torso module 304 may be affixed to the robotic base 250, as previously described, by way of releasably attaching to a leg module 308 having legs 310A, 310B extending upwardly from the robotic base. While the animal configured training aid 300 is shown as a bear in FIG. 28, it should be understood that the present invention is not so limited, and any other animal appearance is considered within the scope of the present invention. In this alternative embodiment, which is generally consistent with the embodiment of the robot base mounted training aid 10, the animal configured training aid 300 may be used for target or marksmanship training for hunter and sportsman training exercises.

In use, a control device, such as a joystick-based controller or an application for a mobile device, such as a smart phone or tablet, may control movement, acceleration, and rotation of the modular training aid 10 with its posable arms 16A, 16B in a desired configuration.

It is contemplated that an alternative embodiment may incorporate any of the features of the previous embodiment described above Many changes and modifications could be made to the invention without departing from the spirit thereof. The scope of these changes and modifications will become apparent from the appended claims.

We claim:

1. A modular training aid for use in a training exercise, comprising:
   a simulated torso module having a rigid frame disposed within a resilient body, the rigid frame comprising a shoulder bar extending from a first end to an opposing second end, one of a plurality of independently posable simulated appendages extending outwardly from each of the first and second ends of the shoulder bar, a first attachment socket extending upwardly of the shoulder bar, and a second, opposing, attachment socket extending downwardly of the shoulder bar;
   a simulated releasable head module having a mounting post that is adapted to be received within the first attachment socket of the simulated torso module and that is adapted to inhibit axial rotation of the simulated releasable head module about the mounting post when the mounting post is received within the first attachment socket, and
   a simulated releasable leg module having a rigid pelvis bar extending from a first end to an opposing second end, one of the plurality of the
   independently posable simulated appendage extending outwardly from each of the first and second ends of the rigid pelvis bar, and a mounting post that is adapted to be received within the second attachment socket of the simulated torso module and to inhibit axial rotation of the simulated releasable leg module about the mounting post when the mounting post is received within the second attachment socket; and
   wherein each of the independently posable simulated appendages is configured to be engaged by a user during the training exercise, each simulated appendage having a core comprising a bendable material that extends about a bend relief disposed at the corresponding end of the rigid shoulder or pelvis bar.

2. The modular training aid of claim 1, wherein each posable simulated appendage is configured to be selectively bent by user manipulation in any of a plurality of user-defined orientations configured to replicate at least one of: abduction, adduction, extension, flexion, rotation, and circumduction movements.

3. The modular training aid of claim 2, wherein each posable simulated appendage has a set range of motion of less than 120° from a neutral position, and the user-defined orientation is within the set range of motion.

4. The modular training aid of claim 3, wherein the set range of motion generally provides for an anatomically accurate position for each posable simulated appendage.

5. The modular training aid of claim 4, wherein each posable simulated appendage is configured to be bendable by user manipulation so as to be passively retained within the user-defined orientation that conforms to the anatomically accurate position for each posable simulated appendage.

6. The modular training aid of claim 1, wherein each posable simulated appendage is configured to be bendable by user manipulation so as to be passively retained in a user-selected position until an external force is applied thereto.

7. The modular training aid of claim 6, wherein each posable simulated appendage is configured such that application of a force during the training exercise of between 0.5 and 3.0 pounds to a position on the posable simulated appendage that is approximately 24 inches from a fixed end of the simulated appendage in a neutral position is sufficient to move the simulated appendage a distance of approximately 1.0 to 2.0 inches from the neutral position.

8. The modular training aid of claim 1, wherein the training exercise is a combative training exercise including at least one of: striking, grappling, restraining, handcuffing, disarming, blocking, dog training, and weapons training.

9. The modular training aid of claim 1, wherein the training exercise is an athletic training exercise including at least one of: pushing, pulling, hitting, kicking, bending, blocking, and tackling.

10. The modular training aid of claim 1, wherein the core of bendable material of each posable simulated appendage exhibits minimal physical memory at a simulated joint location, and wherein a shield is disposed about the core of each posable simulated appendage to limit movement of the posable simulated appendage along a length of the posable simulated appendage adjacent the simulated joint location.

11. The modular training aid of claim 10, wherein the core comprises a metal wire having a diameter of between 0.25 inches and 0.5 inches.

12. The modular training aid of claim 11, wherein the metal is aluminum or an aluminum alloy.

13. The modular training aid of claim 1, wherein the training aid is configured to be held by an instructor during the training exercise such that the instructor bears a totality of a weight of the training aid without additional support.

14. The modular training aid of claim 1, wherein the training aid is configured to be mounted to an external support structure such that the external support structure bears at least a portion of a weight of the training aid during the training exercise.

15. The modular training aid of claim 1, wherein the training aid is configurable to function in a training configuration selected from a group consisting of: a simulated head module, a simulated torso module, a simulated leg module, a simulated head module affixed to a simulated torso module, a simulated torso module affixed to a simulated leg module, and a simulated head module affixed to a simulated torso module affixed to a simulated leg module.

16. The modular training aid of claim 1, wherein the training aid is mounted to a robotic base, the robotic base comprising:
   a first wheel and a second wheel,
   first and second motors, each of which imparts a rotational drive force to a respective one of the wheels to drive the robotic base;
   a controller in electrical communication with the motors for controlling direction and rotational speed thereof;
   a wireless receiver in electrical communication with the controller for receiving a drive signal from a user input device.

17. The modular training aid of claim 1, wherein each of the plurality of independently posable simulated appendages extends about an arcuate outer surface of a bend relief disposed at the corresponding end of the corresponding rigid bar.

18. A modular training aid for use in a training exercise, comprising:
   a simulated torso module comprising a polymer body, a rigid shoulder bar disposed within the body and extending from a first end to an opposing second end, a first posable simulated arm extending outwardly from a first shoulder bend relief at the first end of the rigid shoulder bar, and a second posable simulated arm extending outwardly from a second shoulder bend relief at the second end of the rigid shoulder bar, and an attachment socket extending downwardly of the shoulder bar; and a releasable simulated leg module comprising a rigid pelvis bar extending from a first end to an opposing second end, a first posable simulated leg extending from a first pelvis bend relief at the first end of the rigid pelvis bar, and a second posable simulated leg extending from a second pelvis bend relief at the second end of the rigid pelvis bar, and a mounting post extending upwardly from the rigid pelvis bar, the mounting post being adapted to be received within the attachment socket of the simulated torso module and to inhibit axial rotation of the releasable simulated leg module about the mounting post when the mounting post is received within the attachment socket;

the posable simulated arms and legs each including a core comprising a bendable material that exhibits minimal physical memory at a simulated joint location of the associated posable simulated arm or leg, and a shield disposed about the core to limit movement of the posable simulated arm or leg along a length of the posable simulated arm or simulated leg adjacent the simulated joint location; and wherein the posable simulated arms and legs are each configured to be independently posable for engagement by a user during the training exercise.

19. The modular training aid of claim 18, further comprising an annular handcuff retaining recess formed on or in each of the first and second posable simulated arms adjacent an end of the posable simulated arm.

20. The modular training aid of claim 18, further comprising a removable simulated hand structure having a first void configured to receive a simulated tool therein, the removable simulated hand structure configured to be releasably affixed to an end of the first or second posable simulated arm at an attachment having a socket and a post received within the socket.

21. The modular training aid of claim 20, wherein the removable simulated hand structure is configured to be interchangeably affixed to either the first posable simulated arm or the second posable simulated arm.

22. The modular training aid of claim 18, further comprising a removable simulated foot structure configured to be releasably affixed to an end of the first or second posable simulated leg at an attachment having a socket and a post received within the socket.

23. The modular training aid of claim 18, further comprising a handle configured to engage at least one of the simulated torso module or the simulated leg module, the handle having a grip portion that is held by an instructor during the training exercise.

24. A modular training aid for use in a training exercise comprising:

a modular simulated figure mounted to a robotic base, the robotic base comprising:

a frame supporting first and second wheels that are configured to rest on a support surface when the modular training aid is in an upright orientation, first and second motors, each of which imparts a rotational drive force to a respective one of the wheels to drive the robotic base;

a controller in electrical communication with the motors for controlling direction and rotational speed thereof;

a wireless receiver in electrical communication with the controller for receiving a drive signal from a user input device;

the modular simulated figure extending from the frame, the modular simulated figure comprising:

a simulated leg module having a first end engaging the frame of the robotic base and a mounting post extending upwardly from an opposing second end of the simulated leg module;

a releasable simulated torso module adapted to engage the simulated leg module and comprising a foam body, a rigid shoulder bar disposed within the foam body and extending from a first end to an opposing second end, a first posable simulated arm extending outwardly from a first shoulder bend relief at the first end of the rigid shoulder bar, and a second posable simulated arm extending outwardly from a second shoulder bend relief at the second end of the rigid shoulder bar, a first attachment socket oriented downwardly at a bottom edge of the foam body and configured to receive the mounting post of the simulated leg module therein, and a second attachment socket oriented upwardly at an opposing top edge of the foam body; and a releasable simulated head module having a mounting post that is adapted to be received within the second attachment socket of the simulated torso module and to inhibit axial rotation of the simulated releasable head module about the mounting post when the mounting post is received within the first attachment socket, wherein the first and second posable simulated arms each have a core comprising a bendable material and are each configured to be bendable by user manipulation so as to be independently posable for engagement by a user during the training exercise.

25. The modular training aid of claim 24, wherein the modular training aid is configured to remain in an upright orientation with the first and second wheels resting on the support surface when an impact force of less than 80 pounds is applied to a center of the body.

26. The modular training aid of claim 25, wherein the training exercise includes at least one of: non-lethal electroshock weapon training, projectile weapon training, non-lethal projectile weapon training, and chemical propellant training.

27. The modular training aid of claim 24, wherein the modular training aid is configured to fall into a non-upright orientation with the first and second wheels disengaged from the support surface when an impact force of more than 80 pounds is applied to a center of the body.

28. The modular training aid of claim 27, wherein the training exercise includes at least one of: dog training, grappling, and tackling.

29. The modular training aid of claim 24, wherein the modular simulated figure resembles an animal.

30. The modular training aid of claim 24, further comprising electromagnetic shielding disposed about the controller and configured to prevent damage to the controller when the training exercise is non-lethal electroshock weapon training.

* * * * *